United States Patent
Sakai et al.

(10) Patent No.: US 9,297,544 B2
(45) Date of Patent: Mar. 29, 2016

(54) HUMIDIFICATION DEVICE

(71) Applicant: DAIKIN INDUSTRIES, LTD., Osaka-shi, Osaka (JP)

(72) Inventors: Gakuto Sakai, Sakai (JP); Akihiro Eguchi, Sakai (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 14/423,489

(22) PCT Filed: Sep. 3, 2013

(86) PCT No.: PCT/JP2013/073671
§ 371 (c)(1),
(2) Date: Feb. 24, 2015

(87) PCT Pub. No.: WO2014/038544
PCT Pub. Date: Mar. 13, 2014

(65) Prior Publication Data
US 2015/0300665 A1    Oct. 22, 2015

(30) Foreign Application Priority Data

Sep. 4, 2012 (JP) ................................. 2012-194080

(51) Int. Cl.
| | |
|---|---|
| B01D 53/04 | (2006.01) |
| F24F 3/14 | (2006.01) |
| F24F 3/147 | (2006.01) |
| F24F 11/02 | (2006.01) |
| F25B 17/02 | (2006.01) |
| F24F 11/00 | (2006.01) |

(52) U.S. Cl.
CPC ............... *F24F 3/1429* (2013.01); *F24F 3/147* (2013.01); *F24F 3/1411* (2013.01); *F24F 11/02* (2013.01); *F25B 17/02* (2013.01); *F24F 2011/0026* (2013.01); *F24F 2203/021* (2013.01)

(58) Field of Classification Search
CPC ............. F24F 3/14; F24F 3/17; F24F 3/1429; B01D 53/04; B01D 53/0438; B01D 53/0446
USPC .......................... 96/94, 121; 165/222; 62/271
See application file for complete search history.

(56) References Cited

U.S. PATENT DOCUMENTS

| | | | |
|---|---|---|---|
| 6,178,762 B1 * | 1/2001 | Flax ................................. | 62/271 |
| 7,472,553 B2 * | 1/2009 | Ikegami et al. ................... | 62/94 |

FOREIGN PATENT DOCUMENTS

| | | |
|---|---|---|
| JP | 2002-213780 A | 7/2002 |
| JP | 2009-109120 A | 5/2009 |

(Continued)

*Primary Examiner* — Robert A Hopkins
(74) *Attorney, Agent, or Firm* — Birch, Stewart, Kolasch & Birch, LLP

(57) ABSTRACT

There is provided a humidification device capable of performing humidification in as short a time as possible when an indoor humidity is low. A humidification device includes operation control means for selecting either a humidification priority mode or a normal operation mode based on a predetermined condition to operate the humidification device, and fans that can adjust airflow rates, and generates airflow passing through a condenser and an evaporator, wherein operation in the humidification priority mode is operation in which the airflow rates of the fans are decreased, as compared with operation in the normal operation mode, by which desorption of moisture from an adsorbent of the condenser and collection of moisture by an adsorbent of the evaporator are promoted, as compared with operation in the normal operation mode, so that humidification is given priority over ventilation.

4 Claims, 16 Drawing Sheets

(56) References Cited

FOREIGN PATENT DOCUMENTS

| | | |
|---|---|---|
| JP | 2010-255952 A | 11/2010 |
| JP | 2011-33317 A | 2/2011 |
| JP | 2011-64407 A | 3/2011 |

* cited by examiner

HUMIDIFICATION DEVICE

TECHNICAL FIELD

The present invention relates to a humidification device that humidifies indoor air.

BACKGROUND ART

Patent Literature 1 discloses a humidity control device including a refrigerant circuit that performs refrigerating cycle operation by circulating a refrigerant. The refrigerant circuit of this humidity control device includes two adsorption heat exchangers each carrying an adsorbent, a compressor, an expansion valve, a four way valve, and refrigerant pipes connecting these. Moreover, in the refrigerant circuit, it is possible to alternately perform refrigerating cycle operation in which high-pressure refrigerant flows in one of the two adsorption heat exchangers and the low-pressure refrigerant flows in the other; and refrigerating cycle operation in which the low-pressure refrigerant flows in the one and the high-pressure refrigerant flows in the other, by switching of a refrigerant circulation direction with the four way valve at a predetermined time interval.

The adsorption heat exchanger in which the low-pressure refrigerant flows serves as an evaporator, and can cause moisture contained in air to be adsorbed (collected) by the adsorbent by heat absorption of the refrigerant. Moreover, the adsorption heat exchanger in which the high-pressure refrigerant flows serves as a condenser, and can cause the moisture adsorbed by the adsorbent to be desorbed by the heat of the refrigerant to give the moisture to air. In this manner, in each of the adsorption heat exchangers, the operation of adsorbing the moisture (collection operation) and the operation of desorbing the moisture (reproduction operation) are alternately performed, with the switching of the four way valve.

Moreover, the humidity control device takes outdoor air and indoor air into a casing containing the refrigerant circuit to cause the same to flow through each of the adsorption heat exchangers, and then generates flows of air such that the air is exhausted to an inside and an outside of a room, respectively. When humidification operation is performed, the outdoor air taken into the casing is caused to flow through the adsorption heat exchanger as the condenser, the air is given the moisture desorbed from the adsorbent, and thereafter, the relevant air is supplied to the inside of the room. Moreover, the indoor air taken into the casing is caused to flow through the adsorption heat exchanger as the evaporator, the moisture in the relevant air is adsorbed by the adsorbent, and then, the relevant air is exhausted to the outside of the room.

CITATION LIST

Patent Literature

Patent Literature 1: Japanese Unexamined Patent Publication No. 2009-109120

SUMMARY OF INVENTION

Technical Problem

The foregoing humidity control device performs the operation of giving the outdoor air the moisture collected to the adsorbent from the indoor air to again return the relevant moisture to the inside of the room, when the humidification operation is performed. Thus, in order to quickly humidify the inside of the room, it is necessary to collect more moisture from the indoor air.

However, when the humidity control device is started in a state where an indoor or outdoor humidity is extremely low, or when the indoor or outdoor humidity largely decreases during operation of the humidity control device, the moisture contained in the indoor air is little, which makes it difficult to collect the moisture by the adsorbent of the evaporator, or air having a low humidity flows into the casing from the outside of the room, so that even if the moisture desorbed from the adsorbent of the condenser is given to the relevant air, the humidity does not increase so much, and as a result, the indoor humidification takes relatively long time.

Consequently, an object of the present invention is to provide a humidification device capable of humidifying an inside of a room in as short a time as possible when an indoor humidity is low.

Solution to Problem

The present invention provides a humidification device having two adsorption heat exchangers each carrying an adsorbent, a compressor, an expansion mechanism, and a switching mechanism, and including a refrigerant circuit that circulates a refrigerant by the compressor, in which moisture desorbed from the adsorbent is given to outdoor air passing through a condenser to supply the air to an inside of a room, and moisture of indoor air passing through an evaporator is collected to the adsorbent to exhaust the relevant air to an outside of the room, while alternately performing refrigerating cycle operation in which one of the two adsorption heat exchangers serves as the evaporator, and the other serves as the condenser, and refrigerating cycle operation in which the one serves as the condenser and the other serves as the evaporator by switching of a refrigerant circulation direction by the switching mechanism, so that humidification is performed while performing ventilation, the device including:

operation control means for selecting either of a humidification priority mode and a normal operation mode, based on a predetermined condition to operate the humidification device, and fans that can adjust airflow rates, and generates airflow passing through the condenser and the evaporator, wherein operation in the humidification priority mode is operation in which the airflow rates of the fans are decreased, as compared with operation in the normal operation mode, by which the desorption of the moisture from the adsorbent of the condenser and the collection of the moisture by the adsorbent of the evaporator are promoted, as compared with operation in the normal operation mode, so that the humidification is given priority over the ventilation.

According to the present invention, for example, when the predetermined condition is satisfied when the humidification device is started, during operation of the humidification device, or the like, the operation in the humidification priority mode is executed. In this humidification priority mode, decreasing the airflow rates of the fans reduces an inflow of the outdoor air having a lower humidity to the inside of the room, thereby reducing an external load (latent heat load). On the other hand, by making volumes of the air flowing through the condenser and the evaporator small, a temperature of the condenser can be made higher, and a temperature of the evaporator can be made lower. This can promote the desorption of the moisture from the adsorbent of the condenser and the collection of the moisture by the adsorbent of the evaporator more, so that the indoor humidification can be quickly performed even when the outdoor and indoor temperatures and humidities are low.

In the above-described configuration, the compressor may be of a variable capacity type, and the operation in the humidification priority mode may be operation in which a capacity of the compressor is increased to the maximum.

In this manner, by increasing the capacity of the compressor to the maximum, the temperature of the condenser can be made higher, and the temperature of the evaporator can be made lower, which can promote the desorption of the moisture from the adsorbent of the condenser and the collection of the moisture by the adsorbent of the evaporator more.

It is preferable that the humidity priority mode be executed when an indoor absolute humidity is a predetermined threshold or less, the predetermined threshold being set, based on a target value of the relevant absolute humidity.

Moreover, the humidification priority mode may be executed when an indoor absolute humidity and an outdoor absolute humidity are within a predetermined humidification priority range set based on a target value of the indoor absolute humidity.

The humidification device of the present invention may be configured so as to further include a $CO_2$ concentration sensor that detects an indoor $CO_2$ concentration, wherein even when the condition to execute the humidification priority mode is satisfied, if the $CO_2$ concentration exceeds a predetermined threshold, the operation control means gives priority to either of the normal operation mode and the humidification priority mode to execute the prioritized mode, based on preset priority.

If the airflow rates of the fans are decreased by the humidity priority mode in a state where the indoor $CO_2$ concentration is high, sufficient ventilation cannot be performed, so that there are fears that the indoor environments are deteriorated. Thus, in the present invention, which of the humidification and the ventilation is to be given priority to perform the operation is preset, and even when the condition to execute the humidification priority mode is satisfied, if the $CO_2$ concentration exceeds the predetermined threshold, either of the humidification priority mode and the normal operation mode is selected, based on the preset priority to perform the operation. With the above-described configuration, for example, even when the indoor humidity is lower than the predetermined value, if the $CO_2$ concentration is higher than the predetermined value, the ventilation can be given priority to positively decrease the $CO_2$ concentration.

Advantageous Effects of Invention

The humidification device of the present invention can humidify the inside of the room in as short a time as possible when the indoor humidity is low.

DESCRIPTION OF EMBODIMENTS

Hereinafter, based on the drawings, embodiments of the present invention will be described.

Figure 1:
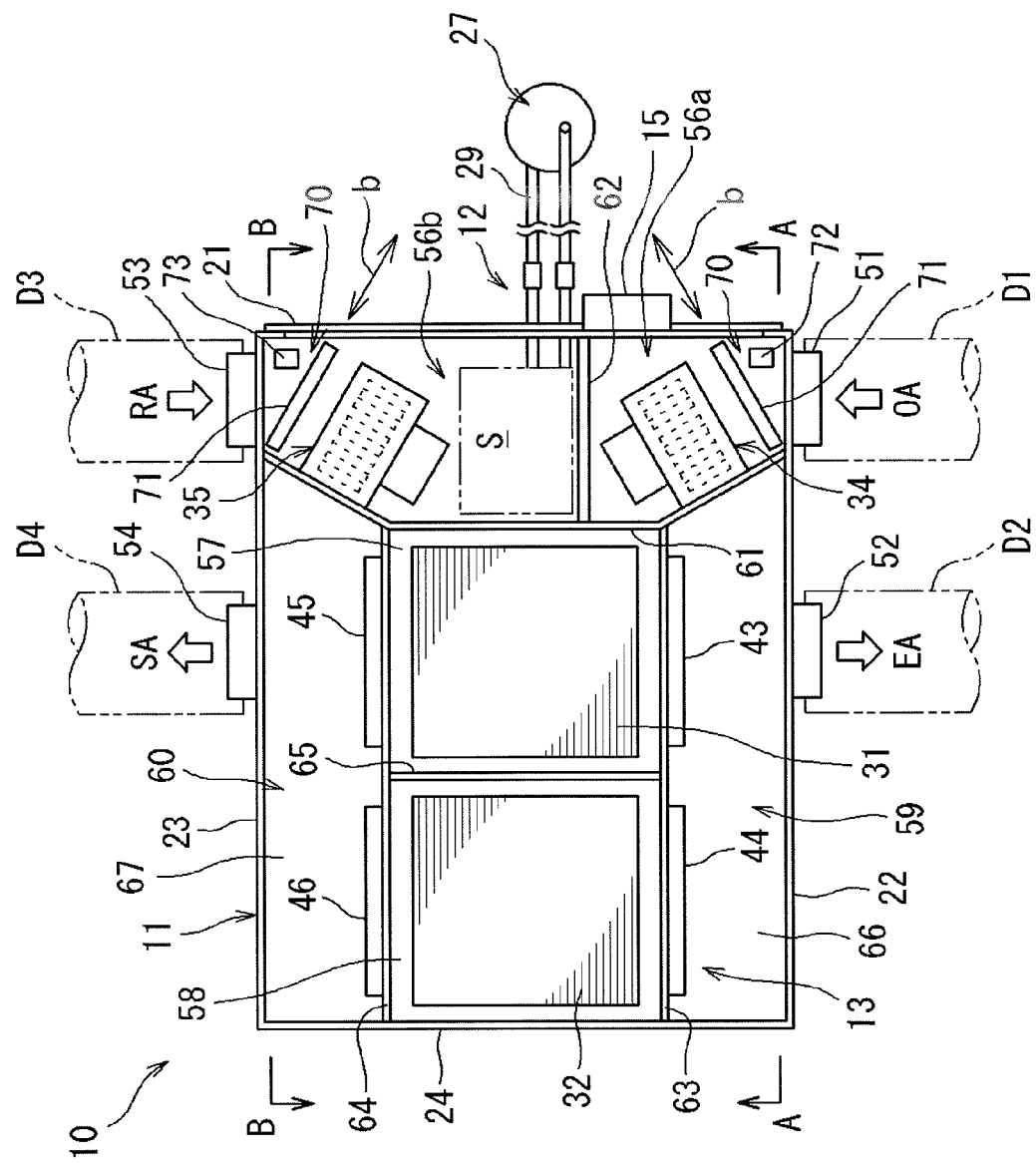
FIG. 1 is an explanatory plan diagram of an inside of a humidity control device according to a first embodiment of the present invention.
Figure 2:
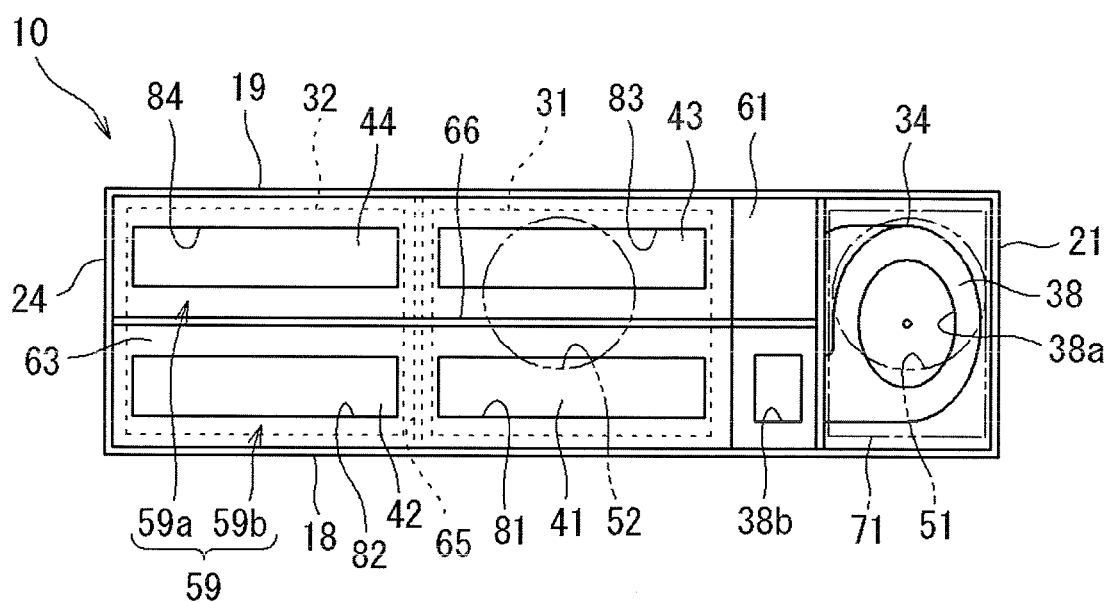
FIG. 2 is an explanatory diagram of the inside of the humidity control device viewed from an A-A line arrow direction in FIG. 1.
Figure 3:
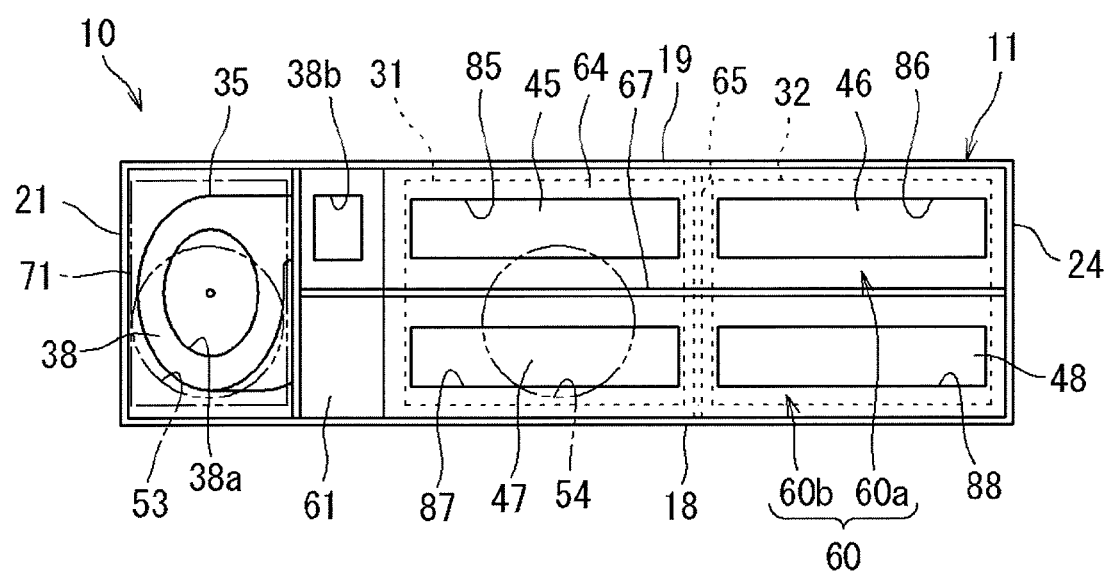
FIG. 3 is an explanatory diagram of the inside of the humidity control device viewed from a B-B line arrow direction in FIG. 1.

FIG. 1 is an explanatory plan diagram of an inside of a humidity control device (humidification device) according to one embodiment of the present invention. FIG. 2 is an explanatory diagram of the inside of the humidity control device viewed from an A-A line arrow direction in FIG. 1. FIG. 3 is an explanatory diagram of the inside of the humidity control device viewed from a B-B line arrow direction in FIG. 1.

The humidity control device 10 of the present embodiment, which performs dehumidification or humidification while performing indoor ventilation, includes a casing 11, a refrigerant circuit 12, an airflow control mechanism 13 and the like.

The casing 11 is formed into a flat rectangular parallelepiped box having a rectangular planar shape. Specifically, the casing 11 includes a bottom plate 18, a top plate 19, and four side plates (first to fourth side plates) 21 to 24. Part of the refrigerant circuit 12, the airflow control mechanism 13 and the like are contained inside a space surrounded by the bottom plate 18, top plate 19, and side plates 21 to 24. Moreover, in one side surface (an outer surface of the first side plate 21), an electric component unit 15 is provided. In the following description, a direction along long sides in the planar shape (rectangular shape) of the casing 11 is a front-back direction, and a direction along short sides is a right-left direction. Moreover, as to the front-back direction, a side of the first side plate 21 is a front side, and a side of the fourth side plate 24 is a back side.

Figure 4:
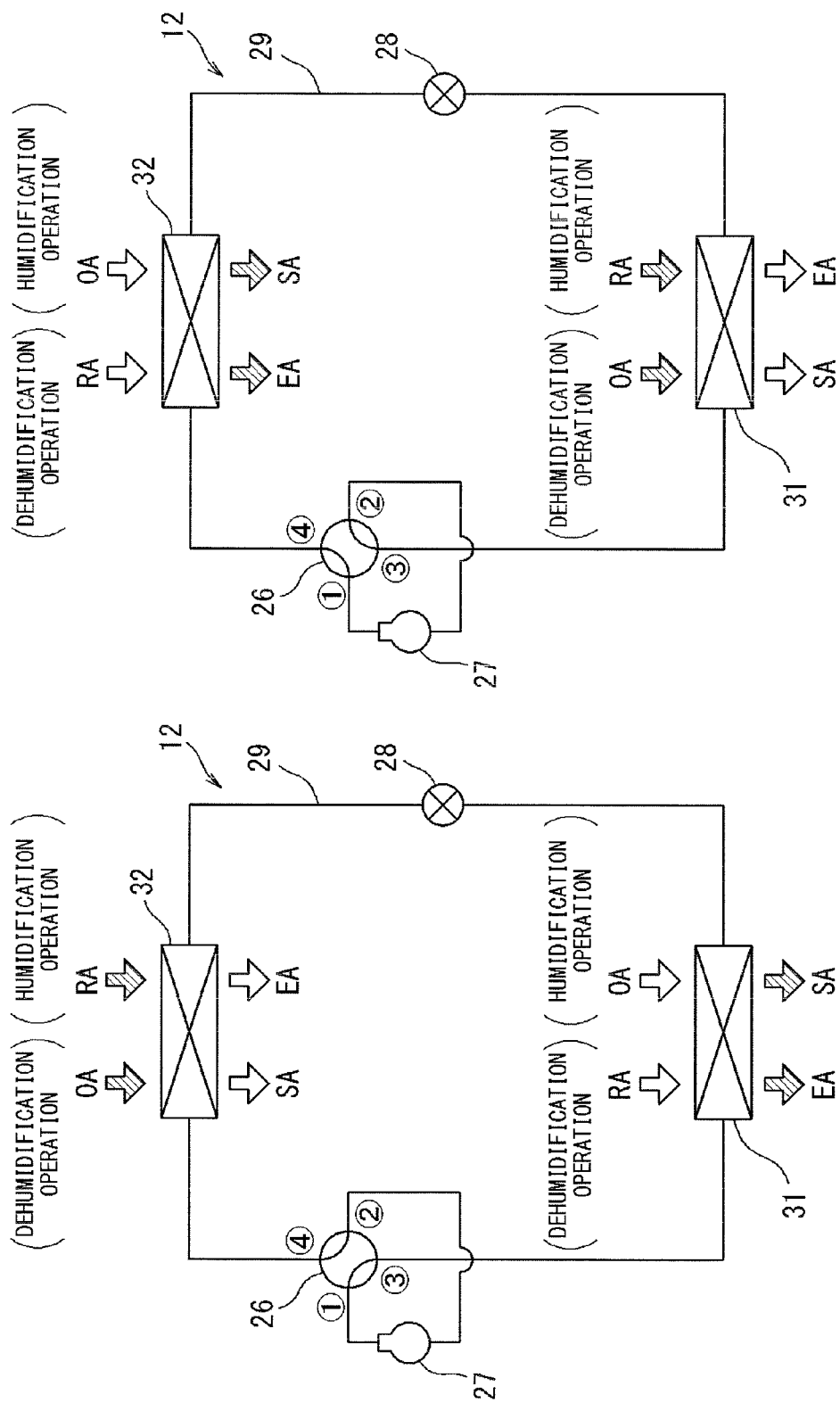
FIGS. 4A and 4B are piping flow diagrams each showing a refrigerant circuit of the humidity control device.

FIGS. 4A and 4B are piping flow diagrams each showing the refrigerant circuit 12 of the humidity control device 10.

The refrigerant circuit 12 is configured by connecting a first heat exchanger 31, a four way valve (switching mechanism) 26, a compressor 27, a second heat exchanger 32, and an electric expansion valve (expansion mechanism) 28 by refrigerant pipes 29, and circulating a refrigerant allows a vapor compression type refrigerating cycle to be executed.

A discharge side of the compressor 27 is connected to a first port of the four way valve 26, and a suction side thereof is connected to a second port of the four way valve 26. One end of the first heat exchanger 31 is connected to a third port of the four way valve 26. Another end of the first heat exchanger 31 is connected to the electric expansion valve 28. One end of the second heat exchanger 32 is connected to a fourth port of the four way valve 26. Another end of the second heat exchanger 32 is connected to the electric expansion valve 28.

The compressor 27 is of a so-called totally-sealed type, and is a variable capacity type compressor in which revolution speed is controlled by an inverter.

The first heat exchanger 31 and the second heat exchanger 32 are each made of a so-called cross fin type, fin and tube type, heat exchanger including heat transfer tubes and a number of fins. Moreover, in each outer surface of the first heat exchanger 31 and the second heat exchanger 32, an adsorbent such as zeolite and the like is carried across almost the entire surface.

The four way valve 26 is configured so as to be switchable between a state where the first port and the third port are communicated with each other and the second port and the fourth port are communicated with each other (refer to FIG. 4A), and a state where the first port and the fourth port are communicated with each other and the second port and the third port are communicated with each other (refer to FIG. 4B). The refrigerant circuit 12 inverts a refrigerant circulation direction by switching the communication state of the ports of this four way valve 26, so that a first refrigerating cycle operation in which the first heat exchanger 31 functions as a condenser, and the second heat exchanger 32 functions as an evaporator, and a second refrigerating cycle operation in which the first heat exchanger 31 functions as an evaporator, and the second heat exchanger 32 functions as a condenser can be performed.

As shown in FIGS. 1 to 3, the airflow control mechanism 13 takes outdoor air and indoor air into the casing 11, and passes the outdoor air and the indoor air through the heat exchangers 31, 32, respectively, and then generates airflow that blows out to an inside and an outside of a room from the casing 11. Specifically, the airflow control mechanism 13 includes a first fan 34 and a second fan 35 that suck the air into the casing 11.

Figure 9:
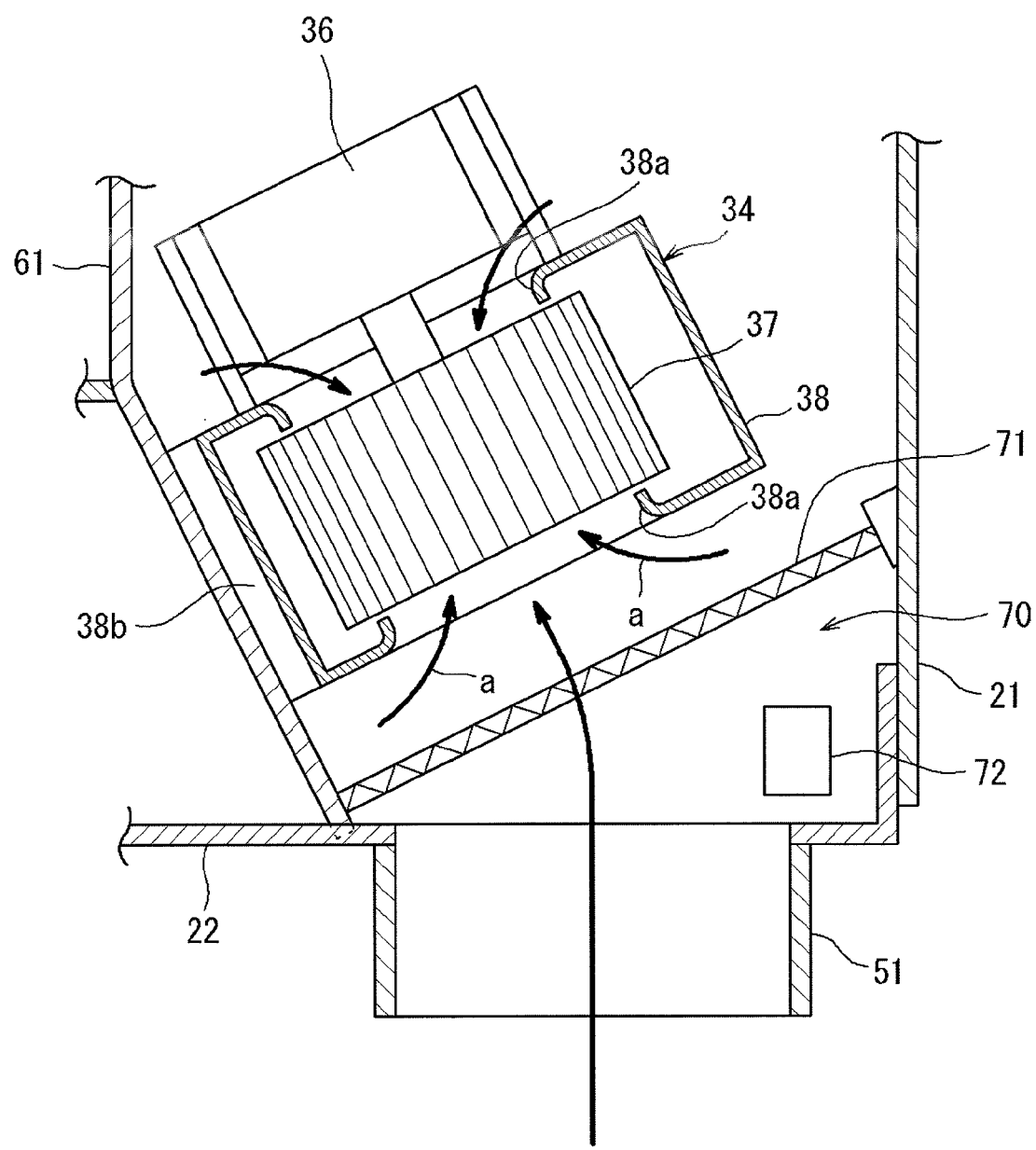
FIG. 9 is a cross-sectional diagram showing a structure around a fan in an enlarged manner.

The first fan 34 and the second fan 35 are each made of a sirocco fan. In the sirocco fan, as shown in FIG. 9, a multi-blade impeller 37 rotated by a motor 36 is provided inside a fan casing 38. The fan casing 38 is formed into a cylindrical shape, and on both side surfaces of the fan casing 38, suction ports 38a are formed, and in an outer surface, a discharge port 38b is formed. Moreover, the first fan 34 and the second fan 35 are each configured so that an airflow rate can be adjusted by inverter control.

Moreover, the airflow control mechanism 13, as shown in FIGS. 1 to 3, includes a plurality of dampers 41 to 48 that control flow paths of the air taken into the casing 11 by the first and second fans 34, 35. Specific operation of the dampers 41 to 48 will be described later.

As shown in FIG. 1, in the second side plate 22 of the casing 11, an outside air intake 51 for taking the outdoor air into the casing 11, and an exhaust outlet 52 for exhausting air from the casing 11 to the outside of the room. are formed. The exhaust outlet 52 is formed substantially in a central portion in the front-back direction of the casing 11, and the outside air intake 51 is formed on a front portion side of the casing 11. In the vicinity of the outside air intake 51, the first fan 34 for outside air intake is arranged. One-end portions of ducts D1, D2 are connected to the outside air intake 51 and the exhaust outlet 52, respectively, and another-end sides of these ducts D1, D2 are connected to the outside of the room (outdoors).

In the third side plate 23 of the casing 11, an inside air intake 53 for taking the indoor air into the casing 11 and a supply air outlet 54 for supplying air to the inside of the room from the casing 11 are formed. The supply air outlet 54 is formed substantially in a central portion in the front-back direction of the casing 11, and the inside air intake 53 is formed on the front portion side of the casing 11. In the vicinity of the inside air intake 53, the second fan 35 for inside air intake is arranged. One-end portions of ducts D3, D4 are connected to the inside air intake 53 and the supply air outlet 54, respectively, and other end sides of the ducts D3, D4 are connected to the inside of the room.

The above-described configuration allows the outside and the inside of the room to be communicated to each other through the ducts D1 to D4 and the casing 11.

In the following description, as shown in FIG. 1, the air taken into the casing 11 from the outside air intake 51 may be expressed by OA, the air taken into the casing 11 from the inside air intake 53 may be expressed by RA, the air exhausted outside the casing 11 from the exhaust outlet 52 may be expressed by EA, and the air exhausted outside the casing 11 from the supply air outlet 54 may be expressed by SA.

As shown in FIG. 1, inside the casing 11, there are provided a first partition wall 61 that partitions the inside of the casing 11 into air blowing chambers 56a, 56b in which the first fan 34 and the second fan 35 are arranged and a space behind the air blowing chambers 56a, 56b. The air blowing chambers 56a, 56b are partitioned by a second partition wall 62 into the first air blowing chamber 56a in which the first fan 34 for outside air intake is arranged, and the second air blowing chamber 56b in which the second fan 35 for inside air intake is arranged. The second air blowing chamber 56b is formed wider in the right-left direction than the first air blowing chamber 56a.

In a space S inside the second air blowing chamber 56b between the first fan 34 and the second fan 35, the electric expansion valve 28, the four way valve 26 and the like making up the refrigerant circuit 12 (refer to FIGS. 4A and 4B) are arranged. The compressor 27 installed outside the casing 11 is connected to the refrigerant pipes 29, which penetrate the first side plate 21 and are drawn out from this space S. However, the compressor 27 may be arranged in the space S inside the casing 11.

Behind the first and second air blowing chambers 56a, 56b inside the casing 11, heat exchange chambers 57, 58 and airflow paths 59, 60 are formed. Specifically, behind the first partition wall 61, a third partition wall 63 and a fourth partition wall 64 extending along the front-back direction are provided side by side in the right-left direction. Front ends of the third partition wall 63 and the fourth partition wall 64 are connected to the first partition wall 61, and back ends thereof are connected to the fourth side plate 24. The heat exchange chambers 57, 58 where the first and second heat exchangers 31, 32 are arranged are formed between the third partition wall 63 and the fourth partition wall 64. The first airflow path 59 and the second airflow path 60 are formed between the third partition wall 63 and the second side plate 22, and between the fourth partition wall 64 and the third side plate 23, respectively.

The heat exchange chambers 57, 58 are partitioned by a fifth partition wall 65 in the front-back direction. The first heat exchanger 31 is arranged in the first heat exchange chamber 57 on a front side, and the second heat exchanger 32 is arranged in the second heat exchange chamber 58 on a back side. As shown in FIGS. 7A to 8B, the first heat exchanger 31 and the second heat exchanger 32 are each arranged in a posture inclined so that the side of the first airflow path 59 is higher than the side of the second airflow path 60. This allows the airflow inside the first and second heat exchange chambers 57, 58 to flow through the first and the second heat exchangers 31, 32 in the right-left direction and in an upper-lower direction. Arranging the first and second heat exchangers 31, 32 in the inclined posture in this manner can expand an area of the airflow, and can enhance heat exchange efficiency and adsorption efficiency of moisture by the adsorbent.

As shown in FIG. 2, the first airflow path 59 is partitioned into two upper/lower stages by a sixth partition wall 66. The discharge port 38b of the first fan 34 for outside air intake arranged in the vicinity of the outside air intake 51 is connected to a first airflow path 59b on a lower side. Moreover, the exhaust outlet 52 is communicated with a first airflow path 59a on an upper side.

As shown in FIG. 3, the second airflow path 60 is partitioned into two upper/lower stages by a seventh partition wall 67. The discharge port 38b of the second fan 35 for inside air intake arranged in the vicinity of the inside air intake 53 is connected to a second airflow path 60a on an upper side. Moreover, the supply air outlet 54 is communicated with a second airflow path 60b on a lower side.

As shown in FIGS. 1 and 9, both right and left end portions of the first partition wall 61 are each inclined so that a more outer portion thereof in the right-left direction is located on a more front side. The discharge ports 38b of the first and second fans 34, 35 are connected to the inclined portions of the first partition wall 61. Moreover, the first and second fans 34, 35 are arranged so that a revolving shaft of each of the impellers 37 is substantially parallel to each of the inclined portions of the first partition wall 61. Accordingly, the first and second fans 34, 35 are arranged in postures inclined to the second side plate 22 and the third side plate 23.

Thus, the suction ports 38a formed in the side surfaces of the fan casings 38 of the first and second fans 34, 35 are arranged apart from the second side plate 22 and the third side plate 23, and air bringing-in spaces 70 are formed between both, which spaces are each substantially triangular in planar view. The air bringing-in spaces 70 each function as a flowing space of the air before being sucked into the fan casing 38 from the suction ports 38a. Particularly, each of the air bringing-in spaces 70 effectively functions as the flowing space of the air (indicated by arrow a in FIG. 9) to flow into the suction ports 38a from an outer circumferential side of the suction ports 38a, and is useful for smoothly guiding the airflow to the suction ports 38a. Accordingly, forming the above-described air bringing-in spaces 70 effectively reduces pressure loss of the air sucked into the suction ports 38a of the first and second fans 34, 35 from the outside air intake 51 and the inside air intake 53, so that the outdoor air and the indoor air can be efficiently taken into the casing 11.

Moreover, since the first and second fans 34, 35 are arranged in the vicinity of the outside air intake 51 and the inside air intake 53, actuation sound and blowing sound of the first and second fans 34, 35 are attenuated while the airflow passes through the inside of the casing 11, as described later. Accordingly, the relevant sound can be prevented from being propagated outside the casing 11 and causing noise.

In each of the air bringing-in spaces 70, an air filter 71 is arranged. These air filters 71 are arranged substantially parallel to the side surfaces of the fans 34, 35. Accordingly, the air filters 71 are also arranged so as to be inclined to the second side plate 22 and the third side plate 23. The above-described inclined arrangement of the air filters 71 can expand an area of the airflow. Moreover, part or all of the first side plate 21 of the casing 11 is configured detachably, and by detaching part or all of the first side plate 21, an attachment/detachment port for attaching and detaching the air filters 71 can be formed. As indicated by arrow b in FIG. 1, the air filters 71 are drawn out obliquely forward, by which the air filters 71 can be detached from the casing 11, so that the air filters 71 can be cleaned or replaced.

In the air bringing-in spaces 70, sensors 72, 73 and the like that measure temperature and humidity of the air taken in from the outside air intake 51 and the inside air intake 53 are provided. Electric wiring of these sensors 72, 73 and the like is drawn from the first and second air blowing chambers 56a, 56b into the electric component unit 15 provided in the first side plate 21. In this manner, the outside air intake 51 and the inside air intake 53 are arranged on the front portion side of the casing 11 together with the electric component unit 15, by which the electric wiring of the sensors 72, 73 and the like can be connected to the electric component unit 15 at short distances. Moreover, penetration of the electric wiring through the partition wall inside the casing 11 is reduced as much as possible, so that air leakage between the partitioned spaces can be prevented from occurring.

The electric component unit 15 arranged on a front surface of the first side plate 21 contains electric parts such as a control board of the humidity control device 10, a control board (inverter board) of the compressor 27 and the first and second fans 34, 35, and the like in an electric component box. In order to conduct inspection, part replacement and the like of the electric component unit 15, a working space for maintenance is formed in front of the casing 11. Moreover, detaching the first side plate 21 enables maintenance of the first and second fans 34, 35, and maintenance of the expansion valve 28, the four way valve 26 and the like in the refrigerant circuit 12 to be performed in the working space in front of the casing 11. Furthermore, as described before, since the air filters 71 are attached and detached in front of the casing 11, the attachment and detachment working of the air filters 71 can be performed, using the same working space.

That is, in the present embodiment, since the electric component unit 15, the first and second fans 34, 35, parts 28, 26 of the refrigerant circuit 12, and the air filters 71 are concentratively arranged in an area on the front portion side, which is one side portion of the casing 11 (an area in the vicinity of the first side plate 21), the working space for maintenance of these can be concentratively provided on the front side of the casing 11. As a result, as compared with a case where the working spaces are provided so as to be distributed around the casing 11, a planar area of all the working spaces can be made as small as possible, and a wider space does not need to be secured around an entire circumference of the humidity control device 10, which reduces limitation on an installation place of the humidity control device 10 to increase a degree of freedom of the installation of the humidity control device 10.

Moreover, the outside air intake 51 and the exhaust outlet 52 are formed in the second side plate 22 of the casing 11, and the inside air intake 53 and the supply air outlet 54 are formed in the third side plate 23 of the casing 11. Therefore, spaces for disposing the ducts D1 to D4 need to be secured around the second side plate 22 and the third side plate 23. On the other hand, since in the fourth side plate 24 of the casing 11, no opening is formed, and no parts are provided, no space needs to be particularly secured around the fourth side plate 24. This enables the humidity control device 10 to be installed so as to arrange the fourth side plate 24 alongside a wall or the like of a building, which also reduces the limitation on the installation place of the humidity control device 10 to increase the degree of freedom of the installation.

Moreover, the ducts D1, D2 disposed toward the outside of the room are connected to the outside air intake 51 and the exhaust outlet 52 formed in the second side plate 22, respectively. The ducts D3, D4 disposed toward the inside of the room are connected to the inside air intake 53 and the supply air outlet 54 formed in the third side plate 23, respectively. Accordingly, as to any of ducts D1 to D4, those disposed toward the same place are connected to the same side plates 22, 23 of the casing 11. This configuration can simplify disposal routes by decreasing the number of times of bending of the ducts or the like, so that spaces required for the installation of the ducts can be made small.

As shown in FIG. 2, in the third partition wall 63, four vent holes 81 to 84 are formed side by side in the front-back direction and in the upper-lower direction. These vent holes 81 to 84 are configured so as to be openable and closable by the dampers 41 to 44.

Moreover, as shown in FIG. 3, in the fourth partition wall 64, four vent holes 85 to 88 are formed side by side in the front-back direction and in the upper-lower direction. These vent holes 85 to 88 are configured so as to be openable and closable by the dampers 45 to 48.

As shown in FIG. 2, the vent holes 83, 84 on the upper stage side formed in the third partition wall 63 are communicated with the first airflow path 59a on the upper stage side. Moreover, the vent holes 81, 82 on the lower stage side are communicated with the first airflow path 59b on the lower stage side.

As shown in FIG. 3, the vent holes 85, 86 on the upper stage side formed in the fourth partition wall 64 are communicated with the second airflow path 60a on the upper stage side. Moreover, the vent holes 87, 88 on the lower stage side are communicated with the second airflow path 60b on the lower stage side.

Among the vent holes 81 to 88 formed in the third and fourth partition walls 63, 64, the four vent holes 81, 83, 85, 87 arranged on the front side are communicated with the first heat exchange chamber 57 on the front side (refer to FIG. 1), and the four vent holes 82, 84, 86, 88 arranged on the back side are communicated with the second heat exchange chamber 58 on the back side (refer to FIG. 1).

Next, specific opening and closing operation of the dampers 41 to 48 and the airflow inside the casing 11 will be described. Each of the dampers 41 to 48 performs opening and closing operation in accordance with the following opening and closing patterns.

As shown in FIG. 2, among the dampers 41 to 44 provided in the third partition wall 63, the front and back dampers 43, 44 on the upper stage side alternately open and close (when one opens, the other closes, and when the other opens, one closes). Similarly, the front and back dampers 41, 42 on the lower stage also alternately open and close. Moreover, the upper and lower dampers 43, 41 on the front side alternately open and close, and the upper and lower dampers 44, 42 on the back side also alternately open and close. Moreover, as shown in FIG. 3, among the dampers 45 to 48 provided in the fourth partition wall 64, the front and back dampers 45, 46 on the upper stage side alternately open and close, and the front and back dampers 47, 48 on the lower stage also alternately open and close. Moreover, the upper and lower dampers 45, 47 on the front side alternately open and close, and the upper and lower dampers 46, 48 on the back side also alternately open and close.

Among the dampers 41, 42, 47, 48 on the lower stage side provided in the third and fourth partition walls 63, 64, the two dampers 41, 47 arranged on the front side make a pair to simultaneously open and close (when one opens, the other also opens, and when one closes, the other also closes), and the two dampers 42, 48 arranged on the back side make a pair to simultaneously open and close.

Similarly, among the dampers 43, 44, 45, 46 on the upper stage side provided in the third and fourth partition walls 63, 64, the two dampers 43, 45 arranged on the front side make a pair to simultaneously open and close, and the two dampers 44, 46 arranged on the back side make a pair to simultaneously open and close.

Figure 5:
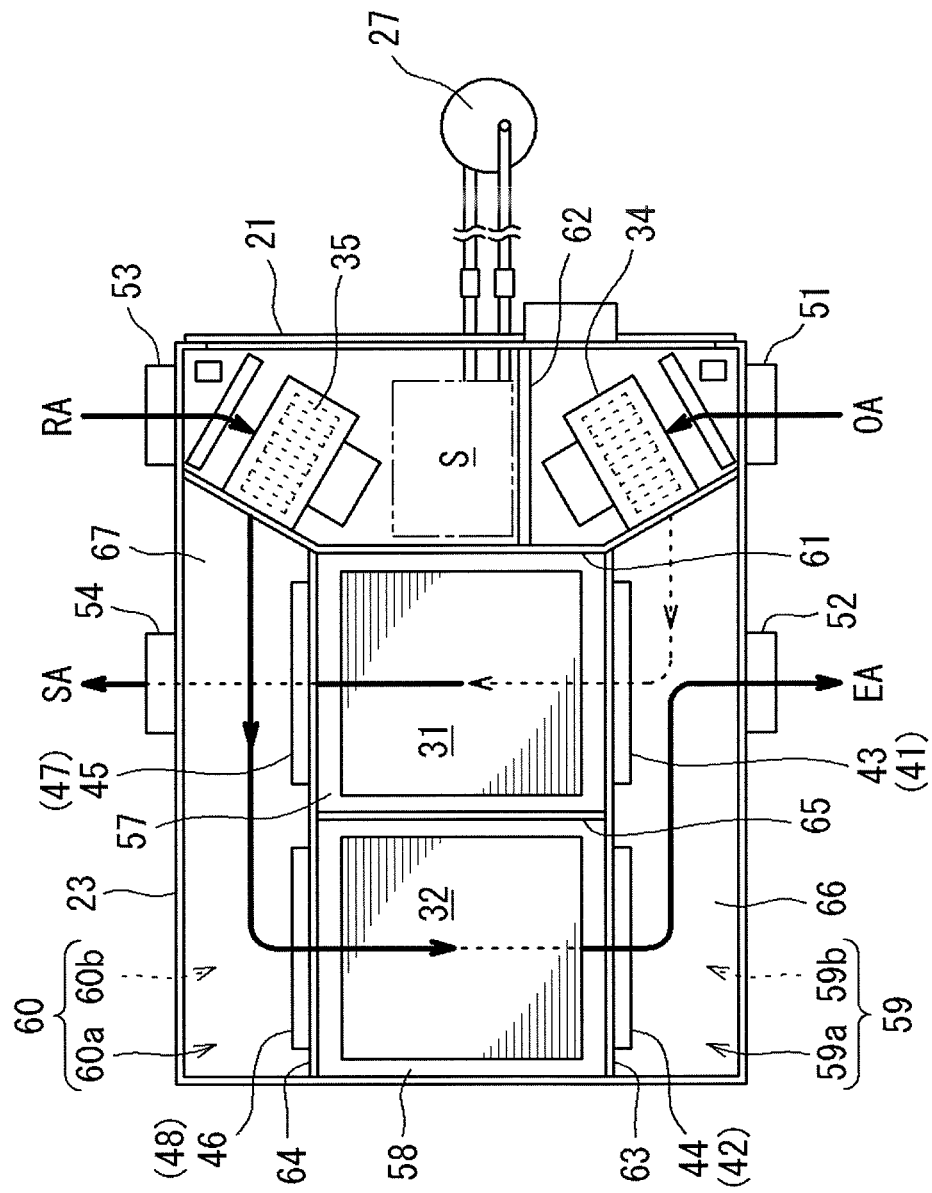
FIG. 5 is an explanatory plan diagram showing a flow of air inside the humidity control device.
Figure 6:
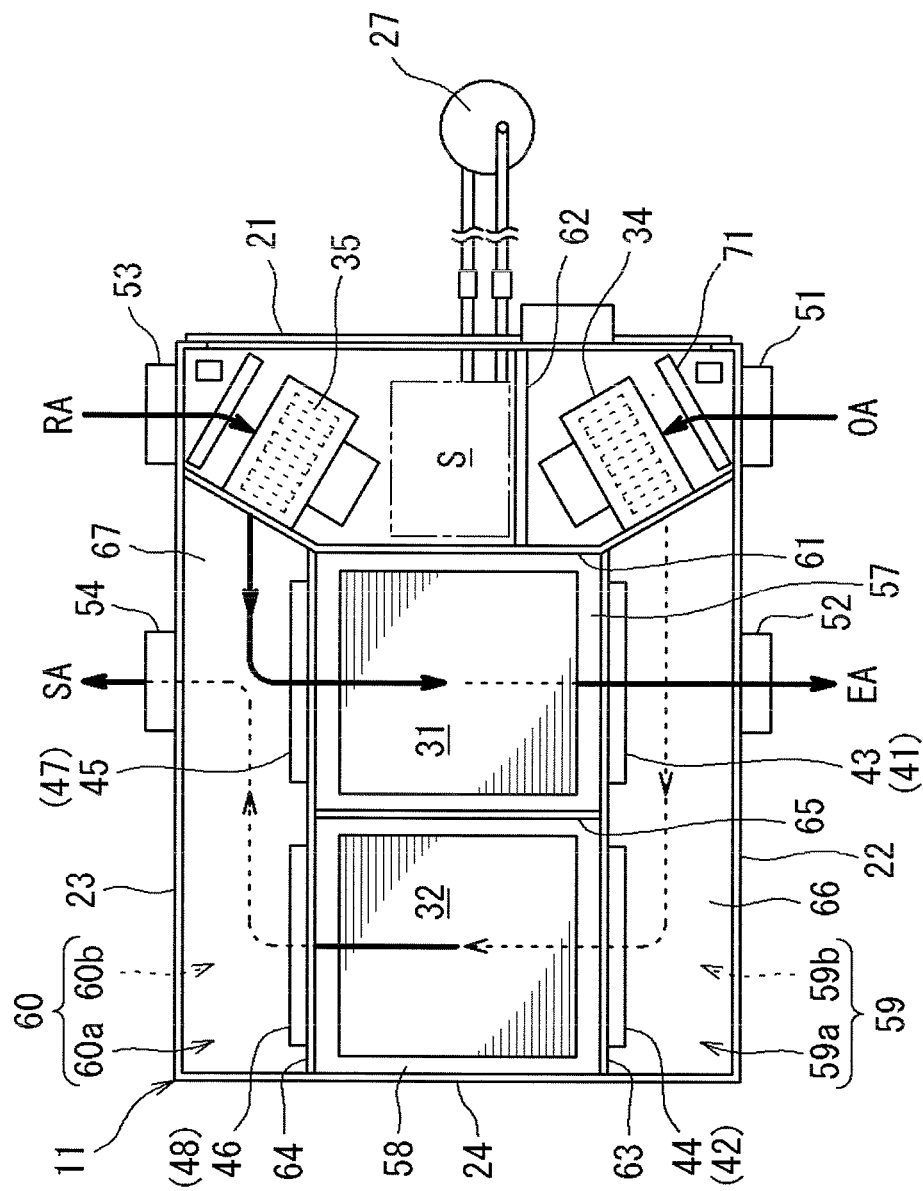
FIG. 6 is an explanatory plan diagram showing a flow of the air inside the humidity control device.

In the present embodiment, combination of the described-above opening and closing patterns of the dampers 41 to 48 allows the airflow to be switched between an aspect shown in FIG. 5 and an aspect shown in FIG. 6.

The aspect shown in FIG. 5 is an aspect in which the outdoor air taken in from the outside air intake 51 by the first fan 34 passes through the first heat exchange chamber 57, and is exhausted from the supply air outlet 54, while the indoor air taken in from the inside air intake 53 by the second fan 35 passes through the second heat exchange chamber 58, and is exhausted from the exhaust outlet 52. Moreover, the aspect shown in FIG. 6 is an aspect in which the outdoor air taken in from the outside air intake 51 by the first fan 34 passes through the second heat exchange chamber 58, and is exhausted from the supply air outlet 54, while the indoor air taken in from the inside air intake 53 by the second fan 35 passes through the first heat exchange chamber 57, and is exhausted from the exhaust outlet 52.

Figure 7A:
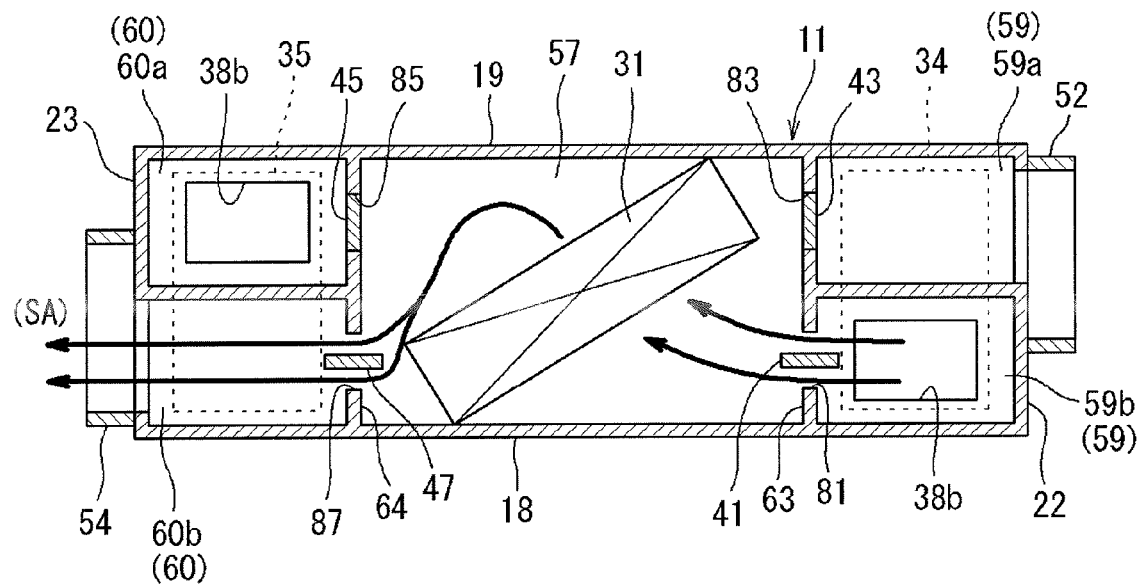
FIGS. 7A and 7B are explanatory diagrams each showing a flow of the air between airflow paths and a heat exchange chamber inside the humidity control device.
Figure 7B:
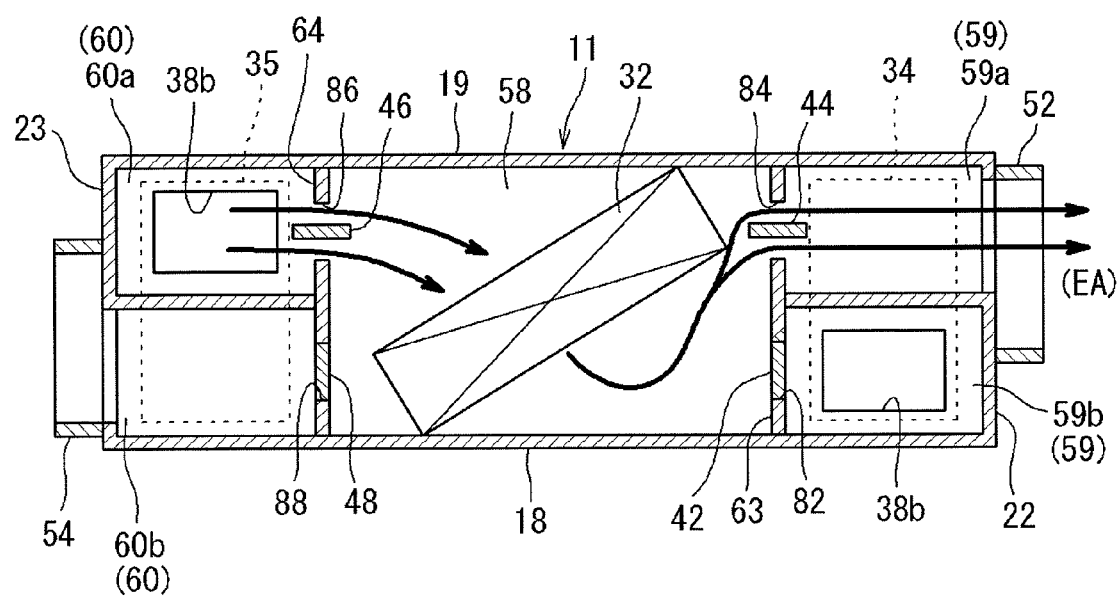

FIGS. 7A and 7B are explanatory diagrams respectively showing airflow between the first and second airflow paths 59, 60, and the first and second heat exchange chambers 57, 58, corresponding to the aspect of the airflow shown in FIG. 5.

As shown in FIG. 7A, airflow flowing in the first airflow path 59b on the lower stage side from the discharge port 38b of the first fan 34 flows into the first heat exchange chamber 57 through the vent hole 81 formed on the lower stage front side of the third partition wall 63. Thereafter, the relevant airflow passes through the first heat exchanger 31, flows into the second airflow path 60b on the lower stage side through the vent hole 87 formed on the lower stage front side of the fourth partition wall 64, and is exhausted to the inside of the room from the supply air outlet 54.

At the same time, as shown in FIG. 7B, airflow flowing in the second airflow path 60a on the upper stage side from the discharge port 38b of the second fan 35 flows into the second heat exchange chamber 58 through the vent hole 86 formed on the upper stage back side of the fourth partition wall 64. Thereafter, the relevant airflow passes through the second heat exchanger 32, flows into the first airflow path 59a on the upper stage side through the vent hole 84 formed on the upper stage back side of the third partition wall 63, and is exhausted from the exhaust outlet 52.

Figure 8A:
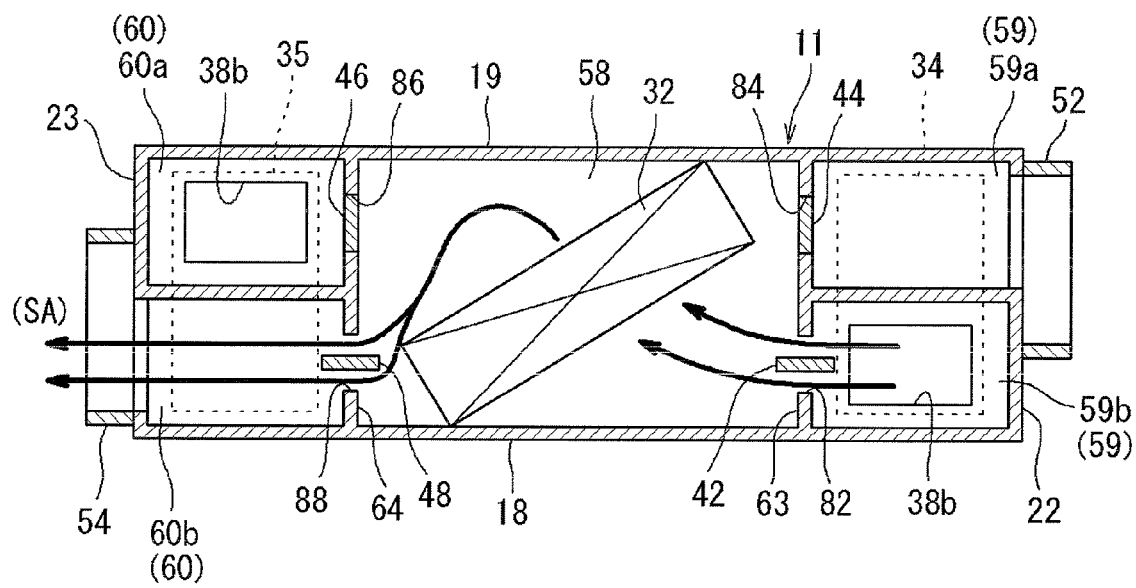
FIGS. 8A and 8B are explanatory diagrams each showing a flow of the air between the airflow paths and the heat exchange chamber inside the humidity control device.
Figure 8B:
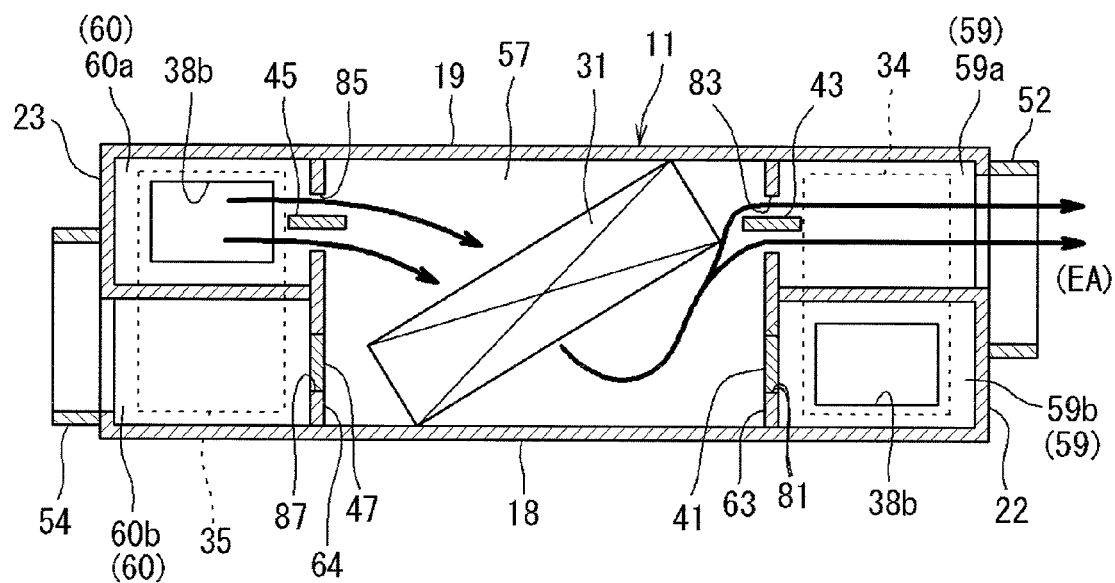

FIGS. 8A and 8B are explanatory diagrams respectively showing airflow between the first and second airflow paths 59, 60, and the first and second heat exchange chambers 57, 58, corresponding to the aspect of the airflow shown in FIG. 6.

As shown in FIG. 8A, airflow flowing in the first airflow path 59b on the lower stage side from the discharge port 38b of the first fan 34 flows into the second heat exchange chamber 58 through the vent hole 82 formed on the lower stage back side of the third partition wall 63. Thereafter, the relevant airflow passes through the second heat exchanger 32, flows into the second airflow path 60b on the lower stage side through the vent hole 88 formed on the lower stage back side of the fourth partition wall 64, and is exhausted to the inside of the room from the supply air outlet 54.

At the same time, as shown in FIG. 8B, airflow flowing in the second airflow path 60a on the upper stage side from the discharge port 38b of the second fan 35 flows into the first heat exchange chamber 57 through the vent hole 85 formed on the upper stage front side of the fourth partition wall 64. Thereafter, the relevant airflow passes through the first heat exchanger 31, flows into the first airflow path 59a on the upper stage side through the vent hole 83 formed on the upper stage front side of the third partition wall 63, and is exhausted to the outside of the room from the exhaust outlet 52.

The aspect of the airflow shown in FIG. 5 and FIGS. 7A and 7B, and the aspect of the airflow shown in FIG. 6, and FIGS. 8A and 8B are executed by being alternately repeated every predetermined time (e.g., every three minutes) in accordance with the switching operation (first and second refrigerating cycle operations) of the refrigerant circulation direction shown in FIGS. 4A and 4B. This enables the humidity control device 10 to perform dehumidification operation and humidification operation.

Description of Dehumidification Operation

First, the dehumidification operation will be described. In the first refrigerating cycle operation, as shown in FIG. 4A, the refrigerant discharged from the compressor 27 radiates heat and condenses in the first heat exchanger 31, and is then sent to the electric expansion valve 28 to be decompressed. The decompressed refrigerant absorbs heat and evaporates in the second heat exchanger 32, and is then sucked into the compressor 27 to be compressed, and is again discharged. Accordingly, in the first refrigerating cycle operation, the first heat exchanger 31 functions as a condenser, and the second heat exchanger 32 functions as an evaporator.

At this time, as shown in FIG. 6 and FIGS. 8A and 8B, the outdoor air OA taken in from the outside air intake 51 passes through the second heat exchanger 32, and the air SA after the heat exchange is exhausted from the supply air outlet 54. Moreover, the indoor air RA taken in from the inside air intake 53 passes through the first heat exchanger 31, and the air EA after the heat exchange is exhausted from the exhaust outlet 52. Specifically, in the first heat exchanger 31 as the condenser, moisture adsorbed by the adsorbent is desorbed by heat of the refrigerant, and is taken into the indoor air RA. Thereby, the adsorbent of the first heat exchanger 31 is reproduced, and the indoor air RA is humidified, and the air EA after the humidification is exhausted to the outside of the room from the exhaust outlet 52. Moreover, in the second heat exchanger 32 as the evaporator, moisture contained in the outdoor air OA is adsorbed (collected) by the adsorbent by heat absorption of the refrigerant, so that the outdoor air OA is dehumidified. The air SA after the dehumidification is supplied to the inside of the room from the supply air outlet 54.

In the second refrigerating cycle operation, as shown in FIG. 4B, the refrigerant discharged from the compressor 27 radiates heat and condenses in the second heat exchanger 32, and is then sent to the electric expansion valve 28 to be decompressed. The decompressed refrigerant absorbs heat and evaporates in the first heat exchanger 31, and is then sucked into the compressor 27 to be compressed, and is again discharged. Accordingly, in the second refrigerating cycle operation, the first heat exchanger 31 functions as an evaporator, and the second heat exchanger 32 functions as a condenser.

At this time, as shown in FIG. 5 and FIGS. 7A and 7B, the outdoor air OA taken in from the outside air intake 51 passes through the first heat exchanger 31, and the air SA after the heat exchange is exhausted from the supply air outlet 54. The indoor air RA taken in from the inside air intake 53 passes through the second heat exchanger 32, and the air EA after the heat exchange is exhausted from the exhaust outlet 52. Specifically, in the second heat exchanger 32 as the condenser, moisture adsorbed by the adsorbent is desorbed by heat of the refrigerant, and is taken into the indoor air RA. Thereby, the adsorbent of the second heat exchanger 32 is reproduced, and the indoor air RA is humidified, and the air EA after the humidification is exhausted to the outside of the room from the exhaust outlet 52. Moreover, in the first heat exchanger 31 as the evaporator, moisture contained in the outdoor air OA is adsorbed (collected) by the adsorbent by heat absorption of the refrigerant, so that the outdoor air OA is dehumidified. The air SA after the dehumidification is supplied to the inside of the room from the supply air outlet 54.

Description of Humidification Operation

Next, humidification operation will be described. In the first refrigerating cycle operation shown in FIG. 4A, the first heat exchanger 31 functions as the condenser, and the second heat exchanger 32 functions as the evaporator. At this time, as shown in FIG. 5 and FIGS. 7A and 7B, the outdoor air OA taken in from the outside air intake 51 passes through the first heat exchanger 31, and the air SA after the heat exchange is exhausted from the supply air outlet 54. The indoor air RA taken in from the inside air intake 53 passes through the second heat exchanger 32, and the air EA after the heat exchange is exhausted from the exhaust outlet 52. Specifically, in the first heat exchanger 31 as the condenser, moisture adsorbed by the adsorbent is desorbed by the heat of the refrigerant, and is taken into the outdoor air OA. Thereby, the adsorbent is reproduced, and the outdoor air OA is humidified, and the air SA after the humidification is supplied to the inside of the room from the supply air outlet 54. Moreover, in the second heat exchanger 32 as the evaporator, moisture contained in the indoor air RA is adsorbed (collected) by the adsorbent by heat absorption of the refrigerant, so that the indoor air RA is dehumidified. The air EA after the dehumidification is exhausted to the outside of the room from the exhaust outlet 52.

In the second refrigerating cycle operation shown in FIG. 4B, the first heat exchanger 31 functions as the evaporator, and the second heat exchanger 32 functions as the condenser. At this time, as shown in FIG. 6 and FIGS. 8A and 8B, the outdoor air OA taken in from the outside air intake 51 passes through the second heat exchanger 32, and the air SA after the heat exchange is exhausted from the supply air outlet 54. The indoor air RA taken in from the inside air intake 53 passes through the first heat exchanger 31, and the air EA after the heat exchange is exhausted from the exhaust outlet 52. Specifically, in the second heat exchanger 32 as the condenser, moisture adsorbed by the adsorbent is desorbed by the heat of the refrigerant, and is taken into the outdoor air OA. Thereby, the adsorbent is reproduced, and the outdoor air OA is humidified, and the air SA after the humidification is supplied to the inside of the room from the supply air outlet 54. Moreover, in the first heat exchanger 31 as the evaporator, moisture contained in the indoor air RA is adsorbed (collected) by the adsorbent by heat absorption of the refrigerant, so that the indoor air RA is dehumidified. The air EA after the dehumidification is exhausted to the outside of the room from the exhaust outlet 52.

Operation Control Example 1

Next, an operation control example in the humidity control device 10 will be described.

Figure 10:
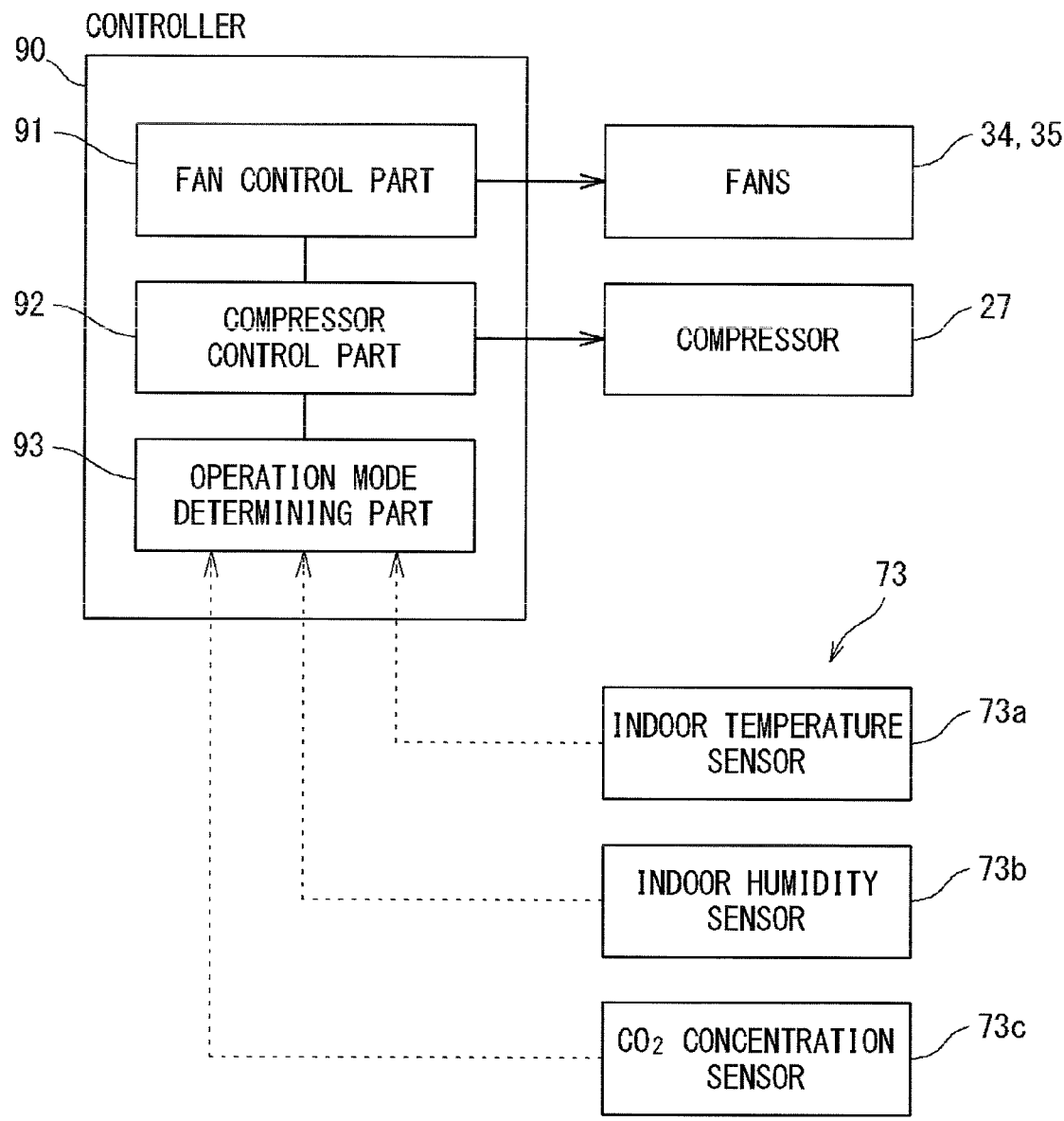
FIG. 10 is a diagram showing a functional configuration of a controller.

The humidity control device 10 includes a controller (operation control means) made of a control board and the like provided in the electric component unit 15, so that the operation is controlled by the controller. Specifically, the controller includes a CPU, a memory and the like, and controls the opening and closing operation of the dampers 41 to 48, opening degree adjustment of the expansion valve 28, the switching operation of the four way valve 26 and the like as described above. Moreover, as shown in FIG. 10, the controller 90 has functions as a compressor control part 92 that inverter-controls a capacity (operating frequency) of the compressor 27, a fan control part 91 that inverter-controls airflow rates (operating frequencies) of the first and second fans 34, 35, and an operation mode determining part 93 that determines an operation mode of the humidity control device 10.

The humidity control device 10 according to the present embodiment has a "starting operation mode" and a "normal operation mode" as operation modes when the humidification operation is performed. The operation mode determining part 93 of the controller 90 determines whether the humidity control device 10 is to be operated in the starting operation mode or in the normal operation mode in accordance with a predetermined condition. The compressor control part 92 and the fan control part 91 control the operation of the compressor 27 and the fans 34, 35, based on a determination result of the operation mode determining part 93.

The normal operation mode in the present embodiment is an operation mode that executes general humidification operation, and is used to maintain an indoor humidity at a target humidity when the indoor humidity is closer to the target humidity. In contrast, the starting operation mode is an operation mode that is executed if the indoor humidity is more away from the target humidity when the humidity control device 10 is started, and gives the humidification priority over indoor ventilation (humidification priority mode).

When the humidification operation is performed by the humidity control device 10 of the present embodiment, moisture of the indoor air is adsorbed by the adsorbent carried by the evaporator while the relevant air passes through the evaporator. When the refrigerant circulation direction of the refrigerant circuit 12 is inverted, the evaporator now becomes the condenser, so that the moisture adsorbed by the adsorbent is taken into the outdoor air to be used for the indoor humidification. Thus, in the state where the indoor humidity when the humidity control device 10 is started is very low, the moisture adsorbed by the adsorbent of the evaporator becomes little, and moisture given to the outdoor air from the adsorbent of the condenser also becomes little. Accordingly, in this case, it is necessary to collect as much moisture as possible from the indoor air, and to give as much moisture as possible to the outdoor air, when the humidity control device 10 is started.

Thus, the humidity control device 10 according to the present embodiment performs operation in which the airflow rates of the fans 34, 35 are decreased, as compared with the normal operation mode, and the capacity of the compressor 27 is increased to the maximum when the starting operation mode is executed.

When the humidity control device 10 is used as the humidification device, since an outdoor humidity becomes still lower than the indoor humidity, there is a possibility that taking in a large amount of outdoor air increases an external load (latent heat load) on the inside of the room. Accordingly, by decreasing the airflow rates of the fans 34, 35, an amount of the air flowing from the outside of the room to the inside of the room can be reduced, thereby lowering the external load.

Moreover, since decreasing airflow rates of the fans 34, 35 reduces an amount of air passing the condenser and the evaporator, a temperature of the condenser becomes higher, and on the contrary, a temperature of the evaporator becomes lower. This promotes desorption of the moisture from the adsorbent of the condenser more, and promotes adsorption of the moisture to the adsorbent of the evaporator. Accordingly, even if the indoor humidity is lower, the indoor humidification can be performed as quickly as possible.

When the capacity of the compressor 27 is increased to the maximum as well, the temperature of the condenser becomes higher, and the temperature of the evaporator becomes lower. Accordingly, the desorption of the moisture from the adsorbent of the condenser is promoted more, and the adsorption of the moisture to the adsorbent of the evaporator is promoted more.

Accordingly, in the present embodiment, if selection of the starting operation mode is determined by the operation mode determining part 93 of the controller 90, the fan control part 91 executes control to decrease the airflow rates of the fans 34, 35 than those in the normal operation mode, and the compressor control part 92 executes control to increase the capacity of the compressor 27 to the maximum.

The operation mode determining part 93 of the present embodiment determines whether or not the starting operation mode is to be selected, based on whether or not a condition of the following expression (1) is satisfied as a predetermined condition.

$$X_1 \le \alpha X_0 \qquad (1)$$

($X_1$: an indoor absolute humidity, $X_0$: an indoor target absolute humidity, $\alpha$: a predetermined coefficient ($\alpha<1$; e.g., $\alpha=0.7$ to $0.8$))

In the vicinity of the inside air intake 53 (refer to FIG. 1) of the humidity control device 10, as shown in FIG. 10, an indoor temperature sensor 73a and an indoor humidity sensor 73b are provided, and an indoor temperature and an indoor relative humidity are detected by the respective sensors 73a, 73b. Detection values of the respective sensors 73a, 73b are inputted to the operation mode determining part 93 of the controller 90, and the operation mode determining part 93 calculates the indoor absolute humidity $X_1$ from the respective detection values.

On the other hand, the humidity control device 10 of the present embodiment is adapted to allow a service man and a user to input an indoor target temperature and an indoor target relative humidity through a remote controller or the like. The operation mode determining part 93 calculates the target absolute humidity $X_0$ from the inputted target temperature and the target relative humidity. The operation mode determining part 93 determines whether or not the indoor absolute humidity $X_1$ and the target absolute humidity $X_0$ satisfy the condition of the above-described expression (1), and selects either the starting operation mode or the normal operation mode, based on the determination result to cause the operation to be executed.

Figure 11:
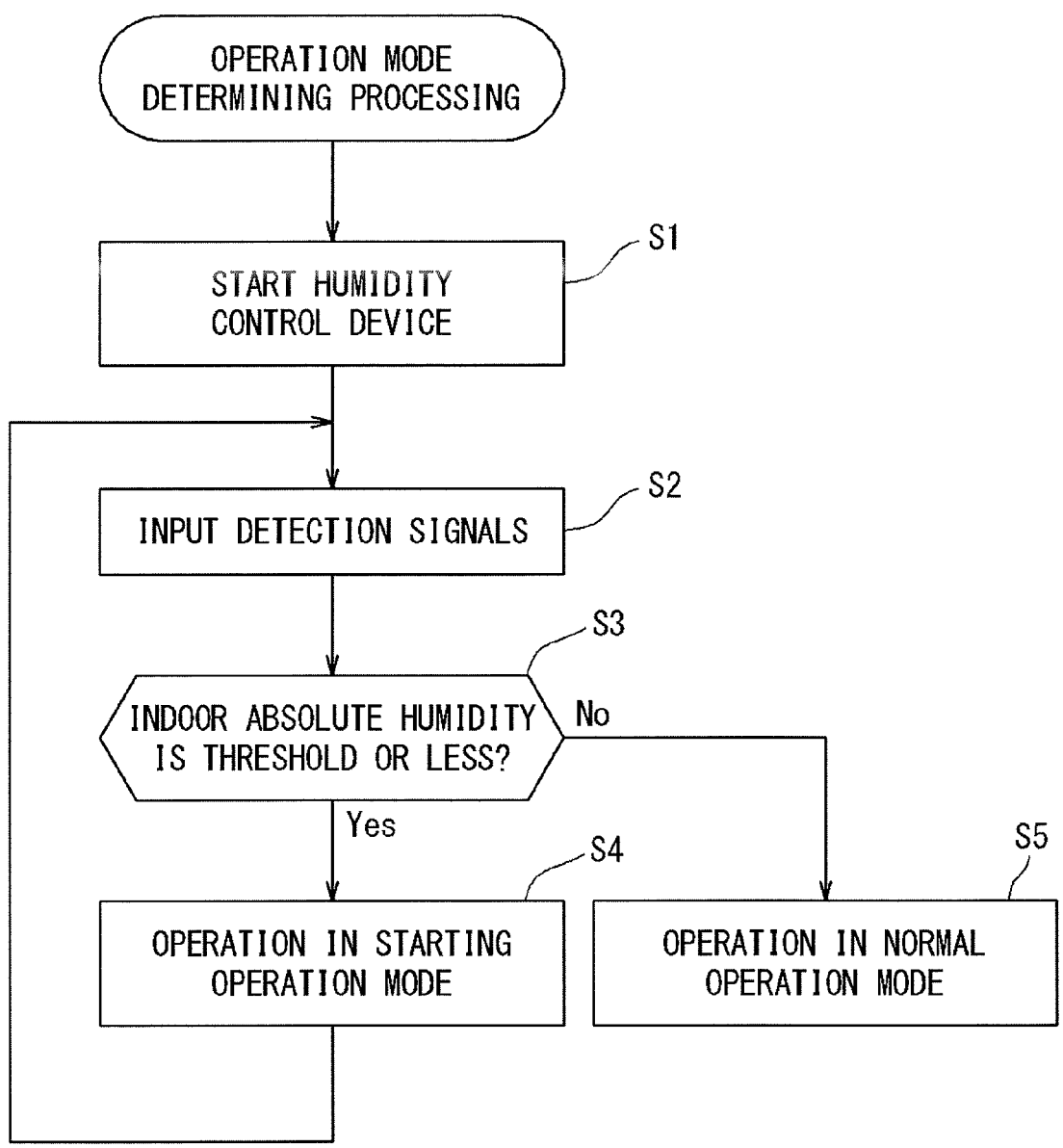
FIG. 11 is a flowchart showing a procedure of determination processing of an operation mode by an operation mode determining part in an operation control example 1.

Hereinafter, one example of a determination processing procedure of the operation mode by the operation mode determining part 93 will be described. FIG. 11 is a flowchart showing the procedure of the determination processing of the operation mode by the operation mode determining part 93 in the operation control example 1.

In FIG. 11, when the humidity control device 10 is started (step S1), the detection values (detection signals) of the indoor temperature sensor 73a and the indoor humidity sensor 73b are inputted to the operation mode determining part 93 of the controller 90 (step S2). The operation mode determining part 93 calculates the indoor absolute humidity $X_1$ from the respective detection values to apply the absolute humidity $X_1$ to the condition expressed by the above-described expression (1), and determine whether or not the indoor absolute humidity $X_1$ is the predetermined threshold ($\alpha X_0$) or less (step S3).

If this determination result is affirmative (Yes), the operation mode determining part 93 determines the selection of the starting operation mode (step S4), gives an instruction to execute the operation in the starting operation mode to the compressor control part 92 and the fan control part 91, and returns the processing to step S2.

On the other hand, if the determination result in step S3 is negative (No), the operation mode determining part 93 determines the selection of the normal operation mode (step S5), and gives an instruction to execute the operation in the normal operation mode to the compressor control part 92 and the fan control part 91.

Even if the indoor humidity is extremely low when the humidity control device 10 is started, performing the above-described control can further promote the desorption of the moisture from the adsorbent of the condenser and the adsorption of the moisture to the adsorbent of the evaporator by the operation in the starting operation mode, as compared with the operation in the normal operation mode, so that the indoor humidification can be quickly performed.

Operation Control Example 2

In the above-described operation control example 1, since during the operation in the starting operation mode, the airflow rates of the fans 34, 35 are decreased, there is a possibility that the indoor ventilation becomes insufficient. In this point, it can be said that the operation in the starting operation mode is operation that promotes the humidification at the sacrifice of ventilation.

However, if an indoor $CO_2$ concentration is high when the humidity control device 10 is started, the starting operation mode disables the Coe concentration to be quickly decreased, which makes it difficult to improve an indoor $CO_2$ environment.

An operation control example 2, which will be described in the following, is an operation control example in which if the indoor $CO_2$ concentration is higher than a predetermined value when the humidity control device 10 is started, the operation in the normal operation mode can be selected in place of the starting operation mode. In order to enable this control, a $CO_2$ concentration sensor 73c (refer to FIG. 10) that detects the indoor $CO_2$ concentration is provided in the vicinity of the inside air intake 53 of the humidity control device 10. A detection value of the $CO_2$ concentration sensor 73c is inputted to the operation mode determining part 93 of the controller 90.

Moreover, it is possible to preliminarily input, to the humidity control device 10, as to which operation in the starting operation mode or in the normal operation mode is executed with priority, that is, which of the humidification and the ventilation is given priority when the $CO_2$ concentration is high. This input can be performed, for example, by the service man or the user, using the remote controller or the like. Even though the above-described expression (1) is satisfied when the humidity control device 10 is started, if the ventilation is given priority, the operation mode determining part 93 determines the selection of the normal operation mode in place of the starting operation mode.

Figure 12:
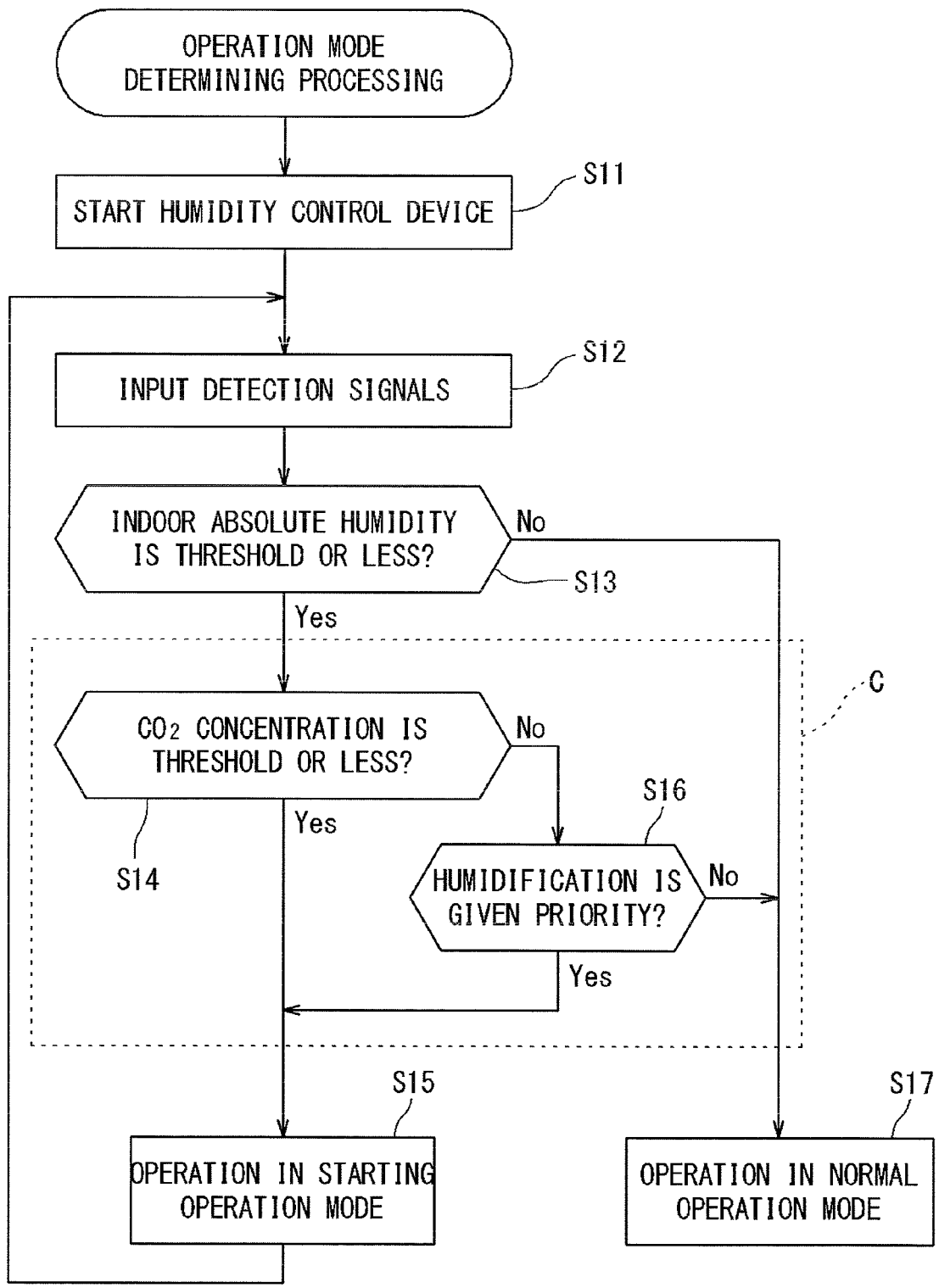
FIG. 12 is a flowchart showing a procedure of the determination processing of the operation mode by the operation mode determining part in an operation control example 2.
Figure 13:
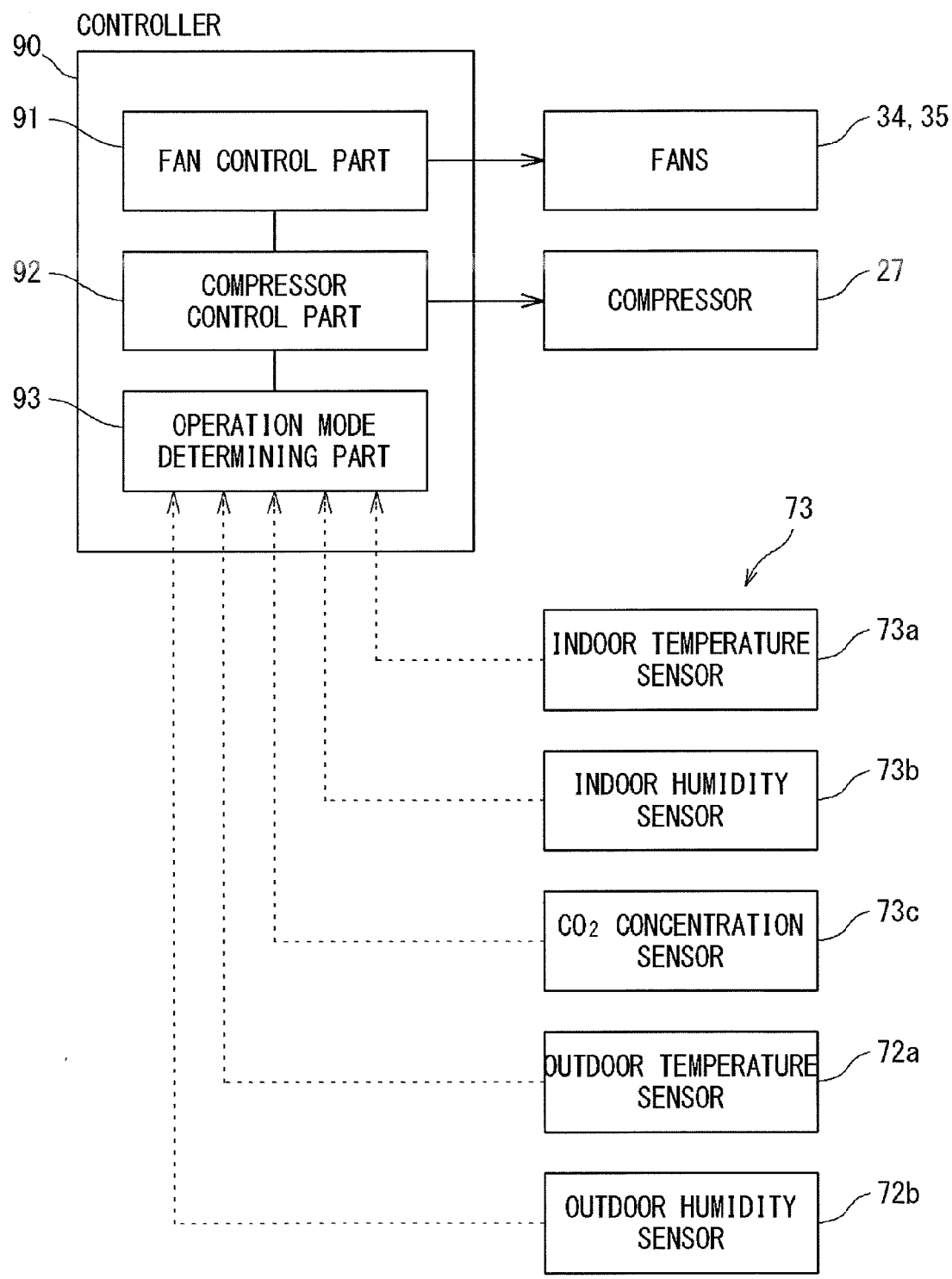
FIG. 13 is a diagram showing a functional configuration of the controller in an operation control example 3.

Hereinafter, the operation control example 2 will be described with reference to FIG. 12. FIG. 12 is a flowchart showing a procedure of the determination processing of the operation mode by the operation mode determining part 93 in the operation control example 2.

In FIG. 12, when the humidity control device 10 is started (step S11), the respective detection values of the indoor temperature sensor 73a, the indoor humidity sensor 73b, and the $CO_2$ concentration sensor 73c are inputted to the operation mode determining part 93 (step S12). The operation mode determining part 93 calculates the indoor absolute humidity $X_1$ from the detection values of the indoor temperature sensor 73a and the indoor humidity sensor 73b, and applies the indoor absolute humidity $X_1$ to the condition expressed by the above-described expression (1) to determine whether or not the indoor absolute humidity $X_1$ is the predetermined threshold ($\alpha X_0$) or less (step S13).

If the determination result in step S13 is affirmative (Yes), subsequently, the operation mode determining part 93 determines whether or not the $CO_2$ concentration is the predetermined threshold or less (step S14). If this determination result is affirmative (Yes), the operation mode determining part 93 selects the operation in the starting operation mode by giving priority to the humidification over the ventilation (step S15), gives an instruction to execute the operation in the starting operation mode to the compressor control part 92 and the fan control part 91, and returns the processing to step S12.

Moreover, if the determination result in step S13 is negative ($N_0$), the operation mode determining part 93 determines the selection of the normal operation mode (step S17), and gives an instruction to execute the operation in the normal operation mode to the compressor control part 92 and the fan control part 91.

On the other hand, the determination result in step S14 is negative (No), the operation mode determining part 93 determines whether or not the humidification is given the preset priority (step S16). If this determination result is affirmative (Yes), the operation mode determining part 93 proceeds with the processing to step S15 to determine the selection of the starting operation mode. If the determination result in step S16 is negative (No), the ventilation is given priority over the humidification, and thus, the operation mode determining part 93 determines the selection of the normal operation mode (step S17).

According to the above-described operation control example 2, even when the indoor humidity when the humidity control device 10 is started is lower than the predetermined value, if the $CO_2$ concentration is higher than the predetermined value, the ventilation can be given priority over the humidification to positively lower the $CO_2$ concentration and improve an indoor environment.

If change of the priority between the humidity and ventilation is not enabled during the operation in the starting operation mode, the processing in steps S14 and S16 (processing surrounded by a broken line C) may be executed for the first time only. This is because if the "priority to humidification" is determined in the first execution, the state of the priority to humidification is maintained thereafter, and the shift to step S16 to step S17 is not performed. Conversely, if the change of the priority between the humidification and the ventilation is enabled during the operation in the starting operation mode, the processing of steps S14 and S16 can be performed every time to preferably follow the relevant change.

Operation Control Example 3

While in either of the above-described operation control examples 1 and 2, the "starting operation mode" in which the humidification is given priority is executed, based on the indoor absolute humidity when the humidity control device 10 is "started", in the operation control example 3, the operation in which the humidification is given priority can be constantly executed, based on a predetermined condition, not only when the humidity control device 10 is started but while the humidification operation is performed by the humidity control device 10.

Accordingly, in the operation control example 3, a "humidification priority mode" is provided as the operation mode of the humidity control device 10. The humidification priority mode includes the "staring operation mode", and further expands the starting operation mode. This humidification priority mode is not totally different from the starting operation mode in the operation control examples 1 and 2, but, for example, when the humidification priority mode of the operation control example 3 is executed when the humidity control device 10 is started, the processing is substantially the same as the execution of the starting operation mode of the operation control examples 1, 2.

Moreover, in the operation control example 3, as the operation mode of the humidity control device 10, as in the operation control example 2, there is provided a "$CO_2$ concentration priority mode" in which the normal operation mode is exceptionally executed without executing the humidification priority mode in which the humidification is given priority when the indoor $Co_2$ concentration exceeds the predetermined threshold.

In the operation control example 3, switching of ON/OFF setting of the humidification priority mode (switching of validity/invalidity) is enabled. Furthermore, when the humidification priority mode is set to ON, switching of ON/OFF setting of the $CO_2$ concentration priority mode (switching of validity/invalidity) is enabled. Which of the ventilation and the humidification is to be given priority can be set in accordance with whether or not the $CO_2$ concentration priority mode is validated. The ON/OFF settings of the humidification priority mode and the $CO_2$ concentration priority mode can be configured to be performed by the service man or the like in accordance with a request of the user, when the humidity control device 10 is installed or after the installation.

To the operation mode determining part 93 of the controller 90 in the operation control example 3 are inputted not only the detection values of the indoor temperature sensor 73a, the indoor humidity sensor 73b, and the $CO_2$ concentration sensor 73c, but detection values of an outdoor temperature sensor 72a and an outdoor humidity sensor 72b.

The operation mode determining part 93 finds the indoor absolute humidity $X_1$ from the detection values of the indoor temperature sensor 73a and the indoor humidity sensor 73b, and an outdoor absolute humidity $X_2$ from the detection values of the outdoor temperature sensor 72a and the outdoor humidity sensor 72b. The operation mode determining part 93 determines whether or not the indoor and outdoor absolute humidities $X_1$, $X_2$ are within a predetermined humidification priority range, and when they are within the humidification priority range, the humidification operation is executed.

Figure 15:
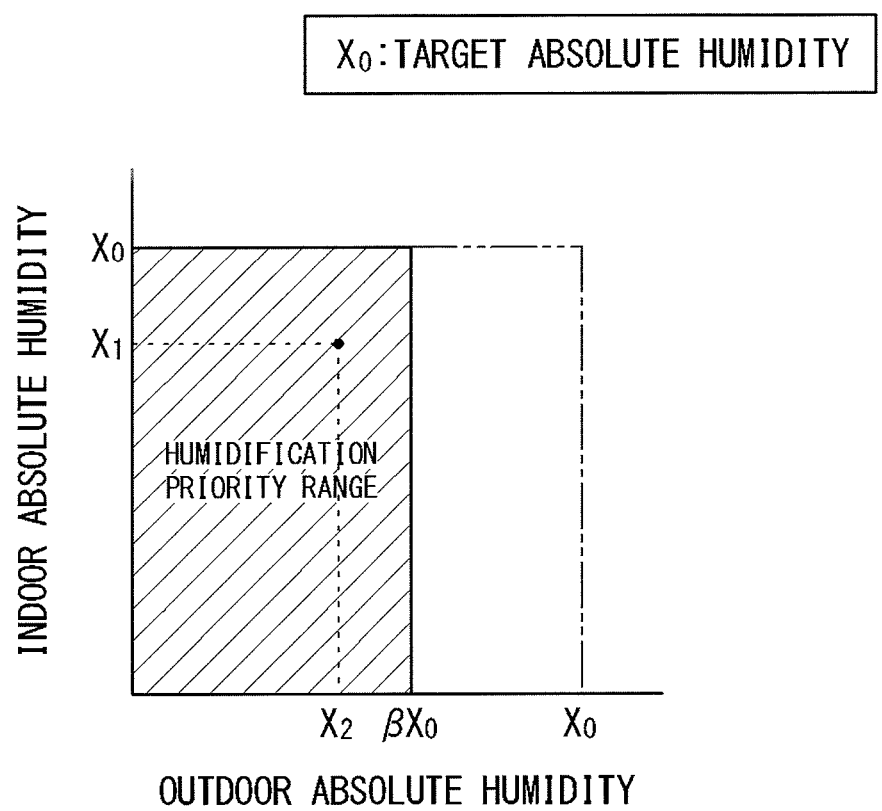
FIG. 15 is a graph showing a humidification priority range.

FIG. 15 is a graph showing the humidification priority range. A horizontal axis of this graph indicates the outdoor absolute humidity, and a vertical axis indicates the indoor absolute humidity. The humidification priority range is a range where the indoor absolute humidity is less than the indoor target absolute humidity $X_0$, and the outdoor absolute humidity is less than a value obtained by multiplying the indoor target absolute humidity $X_0$ by a predetermined coefficient $\beta$ (e.g., $\beta=0.56$ to 0.7, more preferably $\beta=0.63$).

Figure 14:
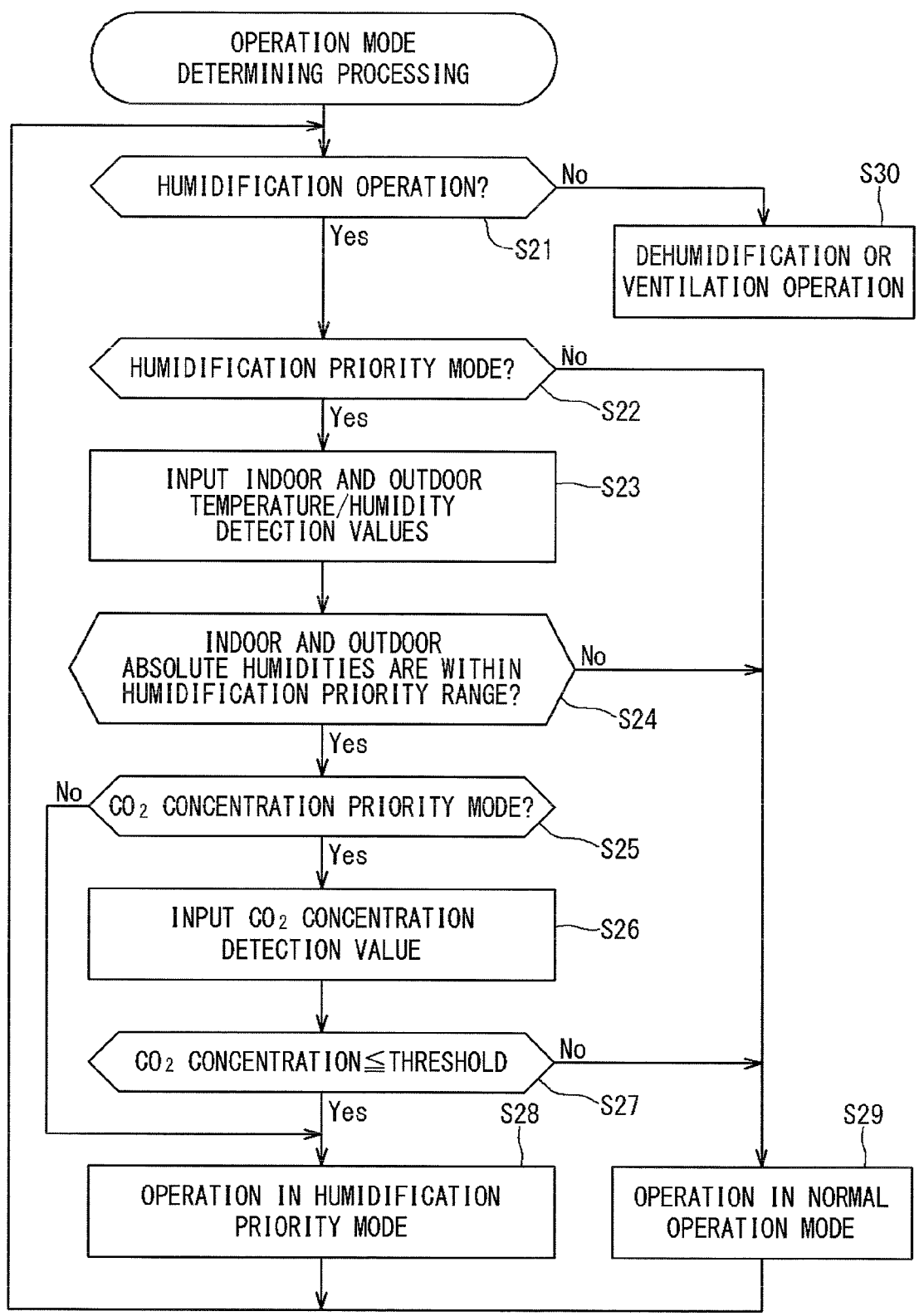
FIG. 14 is a flowchart showing a procedure of the determination processing of the operation mode by the operation mode determining part in the operation control example 3.

Hereinafter, the operation control example 3 will be described with reference to FIG. 14. FIG. 14 is a flowchart showing a procedure of the determination processing of the operation mode by the operation mode determining part 93 in the operation control example 3.

In FIG. 14, when the humidity control device 10 is started, the operation mode determining part 93 determines whether or not the humidification operation has been selected as an operation aspect of the humidity control device 10 (step S21). As described above, the humidity control device 10 enables not only the humidification operation but the dehumidification operation, and further enables "ventilation operation" in which the compressor 27 is stopped and only the fans 34, 35 are operated. Accordingly, the operation mode determining part 93 determines whether or not the humidification operation has been selected, and if the determination result is affirmative (Yes), the operation mode determining part 93 proceeds to step S22. Moreover, if the determination result in step S21 is negative (No), the humidity control device 10 executes the operation in the selected aspect (the dehumidification operation or the ventilation operation) without performing the operation mode determining processing in the humidification operation (step S30).

Next, in step S22, the operation mode determining part 93 determines whether or not the humidification priority mode is set to ON. If this determination result is affirmative (Yes), the processing goes to step S23, and if negative (No), the processing goes to step S29. In this step 29, the operation mode determining part 93 determines the selection of the normal operation mode and gives an instruction to execute the operation in the normal operation mode to the compressor control part 92 and the fan control part 91.

In step S23, the detection values of the indoor temperature sensor 73a, the indoor humidity sensor 73b, the outdoor temperature sensor 72a, and the outdoor humidity sensor 72b are each inputted to the operation mode determining part 93. The operation mode determining part 93 calculates the indoor absolute humidity $X_1$ from the detection values of the indoor temperature sensor 73a and the indoor humidity sensor 73b, and calculates the outdoor absolute humidity $X_2$ from the detection values of the outdoor temperature sensor 72a and the outdoor humidity sensor 72b. Furthermore, the operation mode determining part 93 determines whether or not the indoor and outdoor absolute humidities $X_1$, $X_2$ are each included in the humidification priority range shown in FIG. 15 (step S24).

If the determination result in step S24 is affirmative (Yes), the operation mode determining part 93 proceeds to step S25. If the determination result in step S24 is negative (No), the humidification need not be given priority, and thus, the operation mode determining part 93 determines the selection of the normal operation mode to give an instruction to execute the operation in the normal operation mode to the compressor control part 92 and the fan control part 91 (step S29).

In step S25, the operation mode determining part 93 determines whether or not the $CO_2$ concentration priority mode is set to ON. If this determination result is affirmative (Yes), the detection value of the $CO_2$ concentration sensor 73c is inputted to the operation mode determining part 93 (step S26), and further, whether or not the $CO_2$ concentration is the predetermined threshold or less is determined (step S27). If the $CO_2$ concentration is the predetermined threshold or less (in the case of Yes), the operation mode determining part 93 proceeds to step S28 to determine the selection of the humidity priority mode and give an instruction to execute the operation in the humidification priority mode to the compressor control part 92 and the fan control part 91 (step S28).

Moreover, if the determination result in step S27 is negative (No), that is, if the $CO_2$ concentration exceeds the predetermined threshold, the ventilation is given priority over the humidification. Accordingly, the operation mode determining part 93 proceeds to step S29 to determine the selection of the normal operation mode and give an instruction to execute the operation in the normal operation mode to the compressor control part 92 and the fan control part 91.

If the determination result in step S25 is negative (No) (if the $CO_2$ concentration priority mode is set to OFF), the operation mode determining part 93 proceeds to step S28 to determine the selection of the humidification priority mode.

Accordingly, the present operation control example 3, even when the condition to execute the humidification priority mode is satisfied (Yes in step S24), if the $CO_2$ concentration exceeds the predetermined threshold, either the normal operation mode or the humidification priority mode is given priority and executed, based on the preset priority (ON/OFF setting of the $CO_2$ concentration priority mode in step S25).

During the operation in the humidification priority mode or in the normal operation mode, the operation mode determining part 93 constantly or periodically performs the processing in steps S21 to S27, so that the humidification priority mode and the normal operation mode are selected in accordance with the change of the indoor humidity state as needed.

In the present operation control example 3, the outdoor absolute humidity is employed as information for making a decision as to whether or not to operate in the humidification priority mode. This is because even when the indoor absolute humidity $X_1$ is lower than the target absolute humidity $X_0$, if the outdoor absolute humidity $X_2$ is higher than the predetermined value, the outdoor moisture can be sufficiently taken in to be supplied to the inside of the room without having to perform the operation in the humidification priority mode. However, in the operation control example 3, as in the operation control examples 1, 2, whether or not to execute the humidification priority mode may be determined, using the above-described expression (1). Conversely, in the operation control examples 1, 2 as well, as in the operation control example 3, whether or not to execute the humidity priority mode may be determined, using the humidification priority range in FIG. 15.

The present invention is not limited to the above-described embodiment, but can be modified in a scope of the invention described in claims as needed.

For example, while in the above-described embodiment, the control to decrease the airflow rates of the fans 34, 35 as the starting operation mode and the humidity priority mode, and to maximize the capacity of the compressor 27 is performed, only control to decrease the airflow rates of the fans 34, 35 may be performed.

Moreover, in the operation control examples 1, 2, in the above-described expression (1) used for the determination as to which operation in the starting operation mode or in the normal operation mode is to be performed, a value of the coefficient $\alpha$ can be set in accordance with performance, installation environments and the like of the humidity control device 10 as needed. Similarly, in the operation control example 3, in a graph in FIG. 15 used for determination as to which operation in the humidity priority mode or in the normal operation mode is to be performed, a value of the coefficient $\beta$ can be set in accordance with the performance, the installation environments and the like of the humidity control device 10 as needed.

Moreover, the present invention can be applied to a device dedicated for humidification that performs only humidification without performing the dehumidification.

Figure 16:
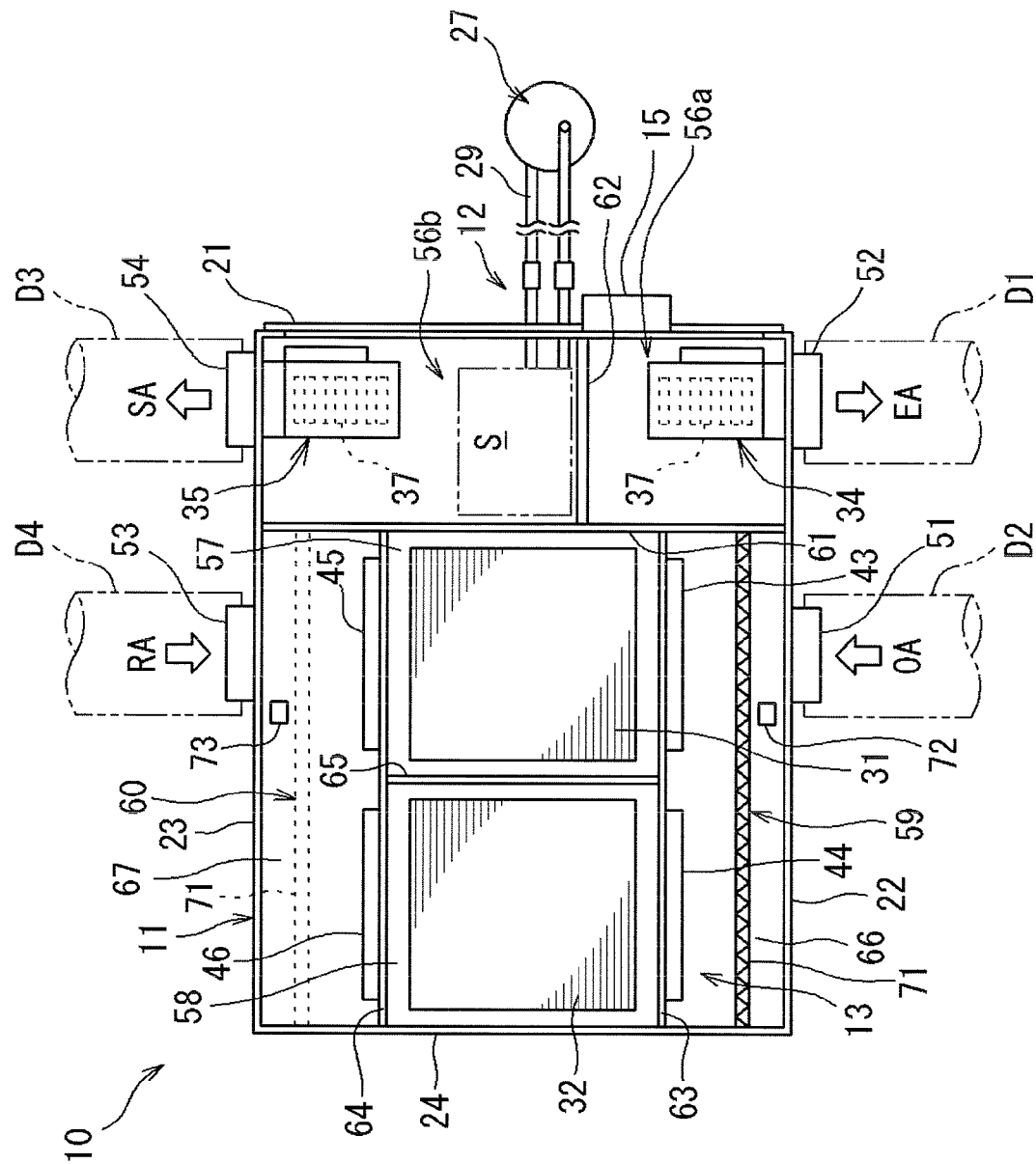
FIG. 16 is an explanatory plan diagram of an inside of a humidity control device according to another embodiment.

Moreover, the humidity control device 10 of the above-described embodiment is an air pushing type humidity control device configured so as to take the indoor and outdoor air into the casing 11 from the outside air intake 51 and the inside air intake 53 arranged in the vicinity of the fans 34, 35, and blow the air from the exhaust outlet 52 and the supply air outlet 54 arranged apart from the fans 34, 35, as shown in FIG. 1. However, the present invention can also be employed for an air suction type humidity control device (humidification device) 10 configured so as to take the indoor and outdoor air into the casing 11 from the outside air intake 51 and the inside air intake 53 arranged apart from the fans 34, 35, and blow the air from the exhaust outlet 52 and the supply air outlet 54 arranged in the vicinity of the fans 34, 35, for example, as shown in FIG. 16.

REFERENCE SIGNS LIST

10: HUMIDITY CONTROL DEVICE (HUMIDIFICATION DEVICE)
12: REFRIGERANT CIRCUIT
13: AIRFLOW CONTROL MECHANISM
15: ELECTRIC COMPONENT UNIT
26: FOUR WAY VALVE (SWITCHING MECHANISM)
27: COMPRESSOR
28: ELECTRIC EXPANSION VALVE (EXPANSION MECHANISM)
31: FIRST HEAT EXCHANGER (ADSORPTION HEAT EXCHANGER)
32: SECOND HEAT EXCHANGER (ADSORPTION HEAT EXCHANGER)
34: FIRST FAN
35: SECOND FAN
90: CONTROLLER (OPERATION CONTROL MEANS)

The invention claimed is:

1. A humidification device comprising:
    two adsorption heat exchangers each carrying an adsorbent, a compressor, an expansion mechanism, and a switching mechanism, and including a refrigerant circuit that circulates a refrigerant by the compressor, in which moisture desorbed from the adsorbent is given to outdoor air passing through a condenser to supply the relevant air to an inside of a room, and moisture of indoor air passing through an evaporator is collected to the adsorbent to exhaust the relevant air to an outside of the room, while alternately performing refrigerating cycle operation in which one of the two adsorption heat exchangers serves as the evaporator, and the other serves as the condenser, and refrigerating cycle operation in which the one serves as the condenser and the other serves as the evaporator by switching of a refrigerant circulation direction by the switching mechanism, so that humidification is performed while performing ventilation;
    an operation controller configured to select means for selecting either of a humidification priority mode and a normal operation mode, based on a predetermined condition to operate the humidification device, and fans that can adjust airflow rates, and generates airflow passing through the condenser and the evaporator; and a $CO_2$ concentration sensor that detects an indoor $CO_2$ concentration, wherein operation in the humidification priority mode is operation in which the airflow rates of the fans are decreased, as compared with operation in the normal operation mode, by which the desorption of the moisture from the adsorbent of the condenser and the collection of the moisture by the adsorbent of the evaporator are promoted, as compared with operation in the normal operation mode, so that the humidification is given priority over the ventilation, and even when the condition to execute the humidification priority mode is satisfied, if the $CO_2$ concentration exceeds a predetermined threshold, the operation control means gives priority to either of the normal operation mode and the humidification priority mode to execute the prioritized mode, based on preset priority.

2. The humidification device according to claim 1, wherein the compressor is of a variable capacity type, and the operation in the humidification priority mode is operation in which a capacity of the compressor is increased to the maximum.

3. The humidification device according to claim 1, wherein the humidity priority mode is executed when an indoor absolute humidity is a predetermined threshold or less, the predetermined threshold being set, based on a target value of the absolute humidity.

4. The humidification device according to claim 1, wherein the humidification priority mode is executed when an indoor absolute humidity and an outdoor absolute humidity are within a predetermined humidification priority range set based on a target value of the indoor absolute humidity.

* * * * *